(12) United States Patent  
Ihama

(10) Patent No.: US 7,241,564 B2  
(45) Date of Patent: Jul. 10, 2007

(54) SILVER HALIDE HOLOGRAPHIC SENSITIVE MATERIAL AND SYSTEM FOR TAKING HOLOGRAPHIC IMAGES BY USING THE SAME

(75) Inventor: Mikio Ihama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/194,450

(22) Filed: Aug. 2, 2005

(65) Prior Publication Data

US 2006/0024626 A1    Feb. 2, 2006

(30) Foreign Application Priority Data

| Aug. 2, 2004 | (JP) | ............... P.2004-225278 |
| Feb. 17, 2005 | (JP) | ............... P.2005-040337 |
| Feb. 17, 2005 | (JP) | ............... P.2005-040343 |
| Mar. 29, 2005 | (JP) | ............... P.2005-095612 |

(51) Int. Cl.  
*G03C 1/005* (2006.01)  
*G03C 1/494* (2006.01)  
*G03C 1/06* (2006.01)

(52) U.S. Cl. ............ 430/567; 430/569; 430/599; 430/603; 430/605

(58) Field of Classification Search ........ 430/567, 430/569, 599, 603, 605  
See application file for complete search history.

(56) References Cited

U.S. PATENT DOCUMENTS 6,949,333 B2 * 9/2005 Mifune ............... 430/569  
2004/0142248 A1   7/2004 Kokeguchi

FOREIGN PATENT DOCUMENTS

| DE | 2 353 864 A | 5/1974 |
| DE | 24 57 620 A | 6/1975 |
| DE | 24 57 836 A | 6/1975 |
| EP | 0 240 466 A2 | 10/1987 |
| EP | 0 241 418 A2 | 10/1987 |
| EP | 0 428 332 A1 | 5/1991 |
| EP | 0 431 584 A1 | 6/1991 |
| FR | 2 198 168 A | 3/1974 |
| FR | 2 219 443 A | 9/1974 |
| JP | 3-203765 A | 9/1991 |
| JP | 3-280078 A | 12/1991 |
| JP | 5-181238 A | 7/1993 |
| JP | 10-123643 A | 5/1998 |
| JP | 10-149084 A | 6/1998 |

OTHER PUBLICATIONS

XP-000979970, M. V. Grichine et al., "An Integrated Pulsed Holography System for Mastering and Transferring onto AGFA or VR-P emulsions" (1998), Proceedings of the SPIE, vol. 3358, pp. 203-210.  
XP-002367749, N.D. Vorzobova et al., "Monochromatic and two-color recording of holographic portraits with the use of pulsed lasters" (1989), Proceedings of the SPIE, vol. 1238, pp. 462-464.  
G. Saxby, "Manual of practical holography" (1991), Focal Pres, pp. 132-133.  
European Search Report dated Mar. 6, 2006.  
Hans I. Bjelkhagen, "Holographic Portraits Made by Pulse Lasers" (1992) Leonardo, vol. 25, No. 5, pp. 443-448.  
XP-000721407, Masashi Iwasaki et al., "Spectral Evaluation of Laboratory-Made Silver Halide Emulsions for Color Holography" (1997), Journal of Imaging Science and Technology, vol. 41, No. 5, pp. 457-467.  
Partial European Search Report dated Nov. 16, 2005.

* cited by examiner

*Primary Examiner*—Geraldina Visconti  
(74) *Attorney, Agent, or Firm*—Sughrue Mion. PLLC

(57) ABSTRACT

A silver halide-holographic sensitive material is provided and has a support and at least one photosensitive emulsion layer, with the photosensitive emulsion layer containing silver halide particles whose number average projected-area diameter is from 10 nm to 80 nm.

4 Claims, 3 Drawing Sheets

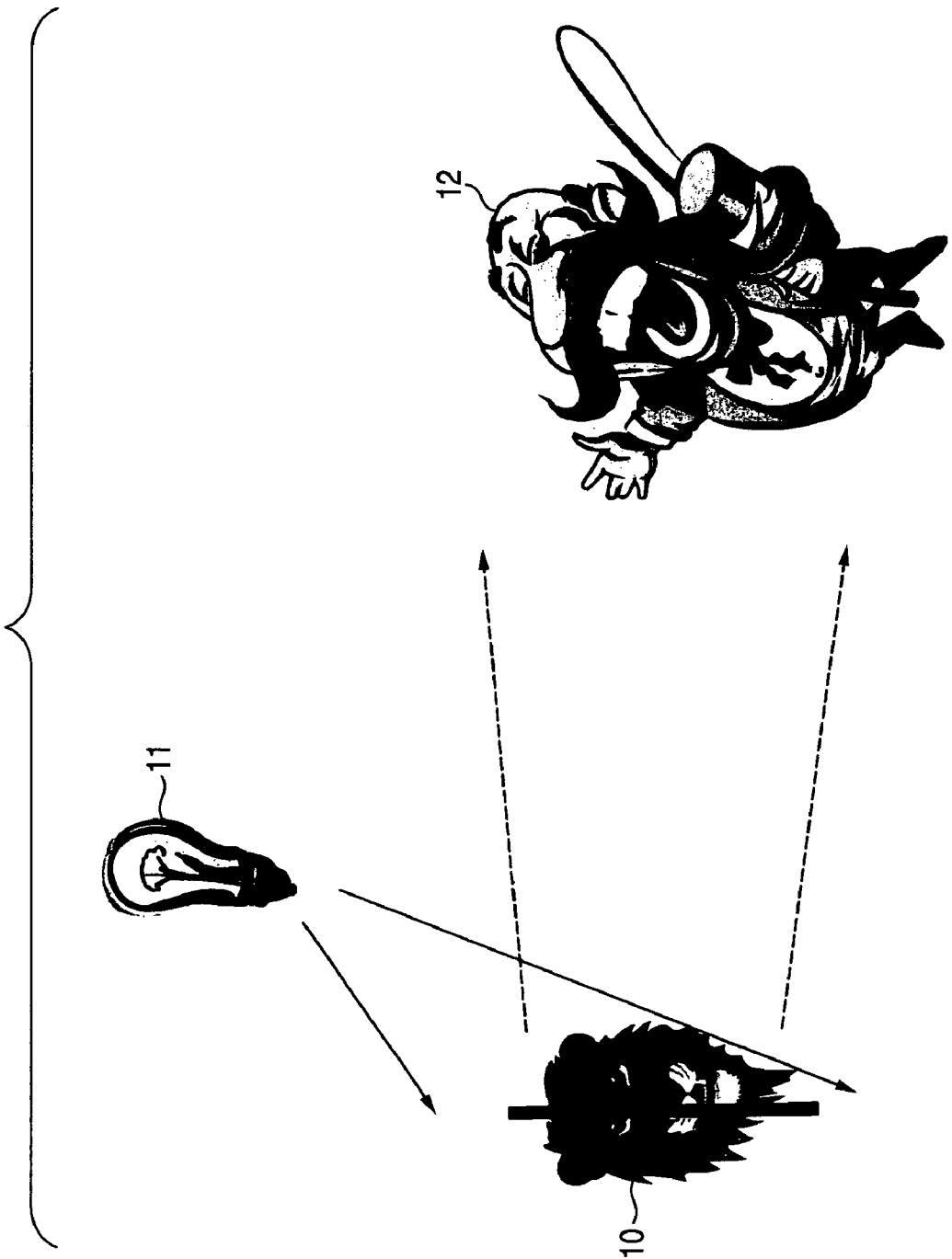

US 7,241,564 B2

SILVER HALIDE HOLOGRAPHIC SENSITIVE MATERIAL AND SYSTEM FOR TAKING HOLOGRAPHIC IMAGES BY USING THE SAME

FIELD OF THE INVENTION

The present invention relates to a silver halide-holographic sensitive material (or a silver halide photographic material for use in holography, which is also referred to as a holographic silver halide photosensitive material) and to a holography system by using such a material.

BACKGROUND OF THE INVENTION

Two-dimensional portraits represented by photographs have gained widespread acceptance and are now established. General photographs can be easily taken with a camera, and development-and-printing service can also be received at a low price. Memorial photographs can be taken in a photo studio, and they can be obtained as photographs of extremely high quality. So it can be said that customer satisfaction with such photographs already reaches a sufficiently high level.

On the other hand, it is hard to say as of this point in time that stereoscopic portraits viewed as three-dimensional images are widely accepted. For establishment of stereoscopic pictures, it is necessary to make stereoscopic portraits meeting customer requirements, not standardized copies of the same picture, available to customers at low prices. For instance, it is anticipated that stereoscopic portraits viewed as three-dimensional images will be more widely accepted and established than two-dimensional pictures so long as stereoscopic portraits of high quality can be delivered to customers at high speed and low prices.

A high-quality three-dimensional image in portrait taking can be obtained through a holographic stereogram, or a hologram. The holographic stereogram, however, requires multiple interference exposures, so it takes too long a time to get one sheet of picture. As a result, it becomes difficult to get a high-quality picture at a low price.

Holography for portrait taking is carried out using pulsed lasers (See, e.g., *LEONARDO*, 1992, Vol. 5, No. 5, pp. 443–448).

Holograms formed using pulsed lasers in portrait taking can be converted into reflection form and reproduced with white light, whereby it becomes possible to enjoy viewing the portraits taken as three-dimensional images. Generalization of such a holographic technology, however, faces a big problem that the images obtained are basically monochromatic black-and-white images in addition to the price problem mentioned above. Although the color seen actually can be modified variously by processing, there are many cases where the portraits obtained look weird because they are monochrome photographs. While full-color holograms can be obtained in principle by using pulsed lasers corresponding to three colors, blue, green and red ones, they require a large-scale taking system, including apparatus.

Further, the holograms formed using those pulsed lasers in portrait taking are copied from transmission form to reflection form without a change in image magnification to result in furtherance of the weirdness as mentioned above. These points cause stumbling blocks to generalization of stereoscopic portraits viewed as three-dimensional images in addition to the problem of being expensive.

Various recording methods have been proposed for photosensitive materials used in wavefront recordings of interference waves, or holography, and they are in actual use. Representatives of photosensitive materials known to be usable in holography are silver halide photosensitive materials, dichromated gelatin photosensitive materials, photoresist materials, photopolymer materials and thermoplastic photosensitive materials. Of these materials, silver halide photosensitive materials feature their high sensitivities, and they are widely used in areas of various types of displays and in the field of researches. More specifically, further sensitization of silver halide photosensitive materials can be utilized for reducing the quantity of laser light used and shortening an exposure time, and can lead to simplification and facilitation of wavefront recordings. Accordingly, even further sensitization of silver halide photosensitive materials for use in holography is a welcome trend in wavefront recordings of interference waves (See, e.g., JP-A-10-123643).

However, silver halide emulsion particles incorporated in a silver halide photosensitive material for use in holography are required to be superfine particles having projected area diameters of 100 nm or less, so there are cases where techniques for sensitization of silver halide emulsion particles for use in general photography are inapplicable just as they are. Conversely, there are cases where techniques inapplicable to silver halide emulsion particles for general photography can serve as techniques to sensitize such superfine particles. On the whole, concurrent performance of gold sensitization and reduction sensitization is forbidden to silver halide emulsion particles hitherto used in photography (See, e.g., JP-A-5-181238). More specifically, while each of gold sensitization and reduction sensitization individually has sensitizing effect, concurrent use of these two sensitization methods causes an increase in fog and deterioration in keeping quality, and makes it impossible to exploit each individual full potential.

In addition, sensitized superfine particles are unstable because their sizes are extremely small, and readily increase in size. And ripening of superfine particles proceeds with the lapse of time during a period from preparation of the silver halide emulsion particles to coating thereof, so silver halide emulsion particles are required to be coated immediately after preparation in some cases. Accordingly, it is unsuccessful yet to produce a holographic silver halide photosensitive material with high reproducibility and high stability by simultaneously coating two or more types of silver halide emulsion particles so as to have a multilayer structure.

Furthermore, since it is exposed to laser light, the silver halide photosensitive material is, in general, spectrally sensitized at the wavelength corresponding to the laser light. Spectral sensitizing dyes suitable for such spectral sensitization are disclosed (See, e.g., JP-A-10-149084).

In addition, spectral sensitization with two types of spectral sensitizing dyes suitable for a holographic photosensitive material used in producing a multicolor hologram is disclosed (See, e.g., JP-A-3-203765).

However, these disclosed sensitization methods are lacking in universal applicability for all wavelengths of generally used typical lasers. More specifically, it is impossible for one sheet of photosensitive material to simultaneously satisfy high sensitivities characteristic thereof to all wavelengths of typical lasers, including the wavelength of 694 nm at which ruby laser operates, the wavelength of 647 nm at which krypton laser operates, the wavelength of 633 nm at which helium-neon laser operates, the wavelength of 532 nm at which YAG laser operates and the wavelengths of 515 nm and 488 nm at which argon laser operates. Such being the case, no sensitive material having high sensitivity to all of typical lasers, or no general-purpose photosensitive material, is found yet.

A silver halide photosensitive material is exposed to laser light, and thereon interference fringes of width narrower than the wavelength of the laser light are recorded. The recorded interference fringes are sensitive to processing of the silver halide photosensitive material. When the silver halide photosensitive material shrinks in thickness at the time of processing, compared with the time of exposure, the wavelength of reproducing light is generally shifted to a shorter wavelength than that of the recording light. This is because the space between interference fringes becomes narrower at the time of processing than at the time of exposure. On the other hand, when the silver halide photosensitive material extends in thickness at the time of processing, compared with the time of exposure, the wavelength of reproducing light is generally shifted to a longer wavelength than that of the recording light. This is because the space between interference fringes becomes wider at the time of processing than at the time of exposure. These shifting of wavelengths are generally conducted by devising pre-treatment or after-treatment of the silver halide photosensitive material. However, these methods give rise to variations in recording characteristics and reproduction characteristics, and make the handling even more inconvenient.

With the intention of circumventing these problems, the art of incorporating the function of controlling a thickness change at after-treatment time into a silver halide photosensitive material itself is disclosed (See, e.g., European Patent No. 240,466).

Further, the sensitive material including two layers having different shrinkage factors at after-treatment time is disclosed (See, e.g., EP-A-241418).

In these disclosed methods, however, there is trouble that the silver halide photosensitive materials suffer degradation in recording characteristics because additives unnecessary to their sensitivity are added. Moreover, the reproduction characteristics are determined near uniquely and cannot be controlled freely by after-treatment. With this being the situation, there is not yet any art of producing holographic silver halide photosensitive materials which are excellent in interference pattern-recording characteristics and provided with freely controllable reproduction characteristics.

SUMMARY OF THE INVENTION

An object of non-limiting, illustrative embodiment of the invention is to produce a holographic silver halide photosensitive material having higher sensitivity and image quality than was previously possible, and what is more, the photosensitive material produced is stable and reproducible satisfactorily.

Another object of non-limiting, illustrative embodiment of the invention is to provide a holographic silver halide photosensitive material having unprecedented versatility and ensuring convenient handling. More specifically, the invention aims to provide a holographic silver halide photosensitive material responding to every usage of laser, including the use of lasers in a single color, the use of lasers in two colors, the use of lasers in three or more colors, the use of stationary-light lasers and the use of pulsed-light lasers.

A further object of non-limiting, illustrative embodiment of the invention is to provide a holographic silver halide photosensitive material having unprecedentedly excellent interference pattern-recording characteristics and freely controllable reproduction characteristics. Furthermore, the invention aims to provide a holographic silver halide photosensitive material that can ensure high image quality.

A still further object of non-limiting, illustrative embodiment of the invention is to provide three-dimensional images which can take the place of traditional two-dimensional images and ensure a high level of customer satisfaction at low cost. And the invention aims to provide stereoscopic portraits in particular from which customers get pleasure.

A first embodiment of the invention enables concurrent use of gold-chalcogen sensitization and reduction sensitization, which has been generally forbidden at the same time. According to this embodiment of the invention, gold-chalcogen sensitization and reduction sensitization can be concurrently carried out during chemical sensitization to result in achievement of both high sensitivity and high image quality. Further, superfine silver halide particles so stable as to cause no change in particle size can be formed, and thereby it becomes possible to produce a holographic photosensitive material having a multilayer structure made up of a green-sensitive silver halide emulsion layer and a red-sensitive silver halide emulsion layer, though silver halide emulsions have never been coated in multiple layers in producing silver halide photosensitive materials for use in holography.

One object of the invention is attained with silver halide-holographic sensitive materials having the following aspects.

(1) A silver halide-holographic sensitive material including: a support; and at least one photosensitive silver halide emulsion layer containing silver halide, wherein a number average diameter of circles equivalent to projected areas of the silver halide particles is from 10 nm to 80 nm, and the silver halide particles are subjected to reduction sensitization in addition to gold-chalcogen sensitization in chemical sensitization thereof (The first embodiment of the invention).

(2) A silver halide-holographic sensitive material as described in (1), wherein the chalcogen sensitization is performed by combined use of selenium sensitization and sulfur sensitization.

(3) A silver halide-holographic sensitive material as described in (1) or (2), wherein the reduction sensitization is performed by addition of a reducing sensitizer.

(4) A silver halide-holographic sensitive material as described in (1), (2) or (3), wherein the at least one photosensitive silver halide emulsion layer further contains a tetrazaindene compound in an amount of $3 \times 10^{-3}$ to $3 \times 10^{-2}$ mole per mole of silver in silver halide particles.

(5) A silver halide-holographic sensitive material including: a support; at least one green-sensitive silver halide emulsion layer having an absorption maximum of 500 nm to 600 nm; and at least one red-sensitive silver halide emulsion layer having an absorption maximum of 600 nm to 750 nm.

(6) A silver halide-holographic sensitive material as described in any of (1) to (4), wherein the at least one photosensitive silver halide emulsion layer comprises: at least one green-sensitive silver halide emulsion layer having an absorption maximum of 500 nm to 600 nm; and at least one red-sensitive silver halide emulsion layer having an absorption maximum of 600 nm to 750 nm.

The present silver halide-holographic sensitive materials having the foregoing aspects are highly sensitive and can offer high image quality. Further, they are stable and can be produced with satisfactory reproducibility.

A second embodiment of the invention enables a sheet of photosensitive material to have high sensitivity to every laser irradiation including ruby laser irradiation, krypton laser irradiation, helium-neon laser irradiation, YAG laser irradiation and argon laser irradiation by use of at least three varieties of spectral sensitizing dyes. According to this embodiment, formation of holograms including monochromatic and polychromatic ones becomes possible and the photosensitive material can have general versatility. And the present photosensitive material can be handled under safelight by further use of a dye absorbing light at optimum wavelengths in spite of its general versatility. In other words, the present photosensitive material has high handling suitability.

Another object of the invention as mentioned above is attained with holographic silver halide photosensitive materials having the following aspects.

(1) A holographic silver halide photosensitive material including: a support; and at least one photosensitive silver halide emulsion layer containing silver halide, wherein a number average diameter of circles equivalent to projected areas of the silver halide particles is from 10 nm to 80 nm, and the silver halide particles are subjected to spectral sensitization by three or more spectral sensitizing dyes (The second embodiment of the invention).

(2) A holographic silver halide photosensitive material as described in (1), which has a first absorption maximum of 500 nm to 550 nm and a second absorption maximum of 600 nm to less than 700 nm by the three or more varieties of spectral sensitizing dyes.

(3) A holographic silver halide photosensitive material as described in (2), wherein the first and second absorption maxima each are in a transmission absorbance range of 0.1 to 0.5.

(4) A holographic silver halide photosensitive material as described in any of (1) to (3), further containing a dye having an absorption maximum of 550 nm to 600 nm.

(5) A holographic silver halide photosensitive material as described in (4), wherein the absorption maximum of the dye is in a transmission absorbance range of 0.3 to 2.0.

(6) A holographic silver halide photosensitive material as described in any of (1) to (5), wherein three or more spectral sensitizing dyes includes two or more spectral sensitizing dyes having absorption maxima of 600 nm to less than 700 nm.

According to the invention, holographic silver halide photosensitive materials having unprecedented versatility and handling convenience can be obtained. More specifically, the holographic silver halide photosensitive materials obtained in accordance with the invention can respond to every usage of laser, including the use of lasers in a single color, the use of lasers in two colors, the use of lasers in three or more colors, the use of stationary-light lasers and the use of pulsed-light lasers.

A third embodiment of the invention is due to findings that a change in layer thickness during processing can be controlled freely by mixed use of low molecular-weight gelatin and normal gelatin in a silver halide emulsion layer. More specifically, the third embodiment is based on a discovery that extension of a processing time for washing causes even elution of low molecular-weight gelatin from silver halide emulsion layers having undergone hardening treatment. Utilization of such elution makes it possible to control freely the wavelength of reproduction light as the layer strength is retained and to satisfy recording and reproduction characteristics of an interference pattern and handling properties at the same time. Further, holographic silver halide photosensitive materials capable of offering high image quality can be obtained by devising backing layers and introducing special additives into emulsion layers.

Still another object of the invention is attained with holographic silver halide photosensitive materials having the following aspects.

(1) A holographic silver halide photosensitive material including a support; and at least one photosensitive silver halide emulsion layer containing silver halide, wherein a number average diameter of circles equivalent to projected areas of the silver halide particles is from 10 nm to 80 nm, and the at least one photosensitive silver halide emulsion layer further comprises: a low molecular-weight gelatin having a weight average molecular weight of 3,000 to 50,000; and a gelatin having a weight average molecular weight of 80,000 or more (The third embodiment of the invention).

(2) A holographic silver halide photosensitive material as described in (1), further including at least one backing layer on an opposite side of the support from the at least one silver halide emulsion layer, wherein a ratio of a total amount of gelatin coated for the at least one backing layer to a total amount of gelatin coated for the at least one silver halide emulsion layer is from 0.3 to 1.0.

(3) A holographic silver halide photosensitive material as described in (2), wherein the at least one backing layer comprises a matting agent.

(4) A holographic silver halide photosensitive material as described in any of (1) to (3), wherein the at least one silver halide emulsion layer further comprises a radical scavenger.

(5) A holographic silver halide photosensitive material as described in any of (1) to (4), wherein the support is a cellulose triacetate film having a thickness of 100 µm to 300 µm.

According to the invention can be obtained holographic silver halide photosensitive materials whose recording characteristics of interference patterns are more excellent than ever and whose reproduction characteristics can be controlled freely. Further, the holographic silver halide photosensitive materials obtained can have unprecedented versatility and handling convenience and offer high image quality.

The present systems for taking holographic images are based on a discovery that even three-dimensional images taken with light beams of two colors alone, namely green light and red light, can be viewed as nearly full-color, natural three-dimensional pictures by the human eye and on findings that it is feasible to prepare silver salt photosensitive materials highly sensitive to both green light and red light. By these discoveries, it becomes possible to provide three-dimensional portraits free from weirdness and capable of giving comfort and satisfaction to customers. And systems for taking holographic images, expressly for taking portraits in accordance with holography, can be obtained.

A further object of the invention is attained with holographic image-taking systems having the following aspects.

(1) A holography system, wherein a transmission hologram is recorded at two different wavelengths in a sheet of silver halide photosensitive material by synchronizing only two different pulsed lasers, one of the two different pulsed lasers having an emission wavelength of 500 nm to less than 600 nm and the other of the two different pulsed laser having an emission wavelength of 600 nm to less than 700 nm.

(2) A holography system, wherein a reflection hologram is recorded at two different wavelengths in a sheet of silver halide photosensitive material from a transmission hologram as described in (1) by synchronizing only two different pulsed lasers, one of the two different pulsed lasers having an emission wavelength of 500 nm to less than 600 nm and the other of the two different pulsed laser having an emission wavelength of 600 nm to less than 700 nm.

(3) A holography system as described in (2), wherein the reflection hologram is recorded via a reduction optical system (the recording magnification is not greater than 1).

(4) A holography system as described in any of (1) to (3), wherein an object of the transmission hologram is a person.

(5) A holography system as described in (3), wherein an object of the transmission hologram is a person, recordings of transmission holograms are made for customers in many places, and recordings of reflection holograms from the transmission holograms are performed with concentration in a few places.

According to the invention, three-dimensional images capable of taking the place of traditional two-dimensional images and ensuring a high level of customer satisfaction are obtained at low cost. And a special pleasure of viewing stereoscopic portraits can be given to customers.

BRIEF DESCRIPTION OF THE DRAWINGS

FIG. 3 shows an example of how to view a reflection hologram recorded by a holography system according to a non-limiting, illustrative embodiment of the invention.

DETAILED DESCRIPTION OF THE INVENTION

Figure 1:
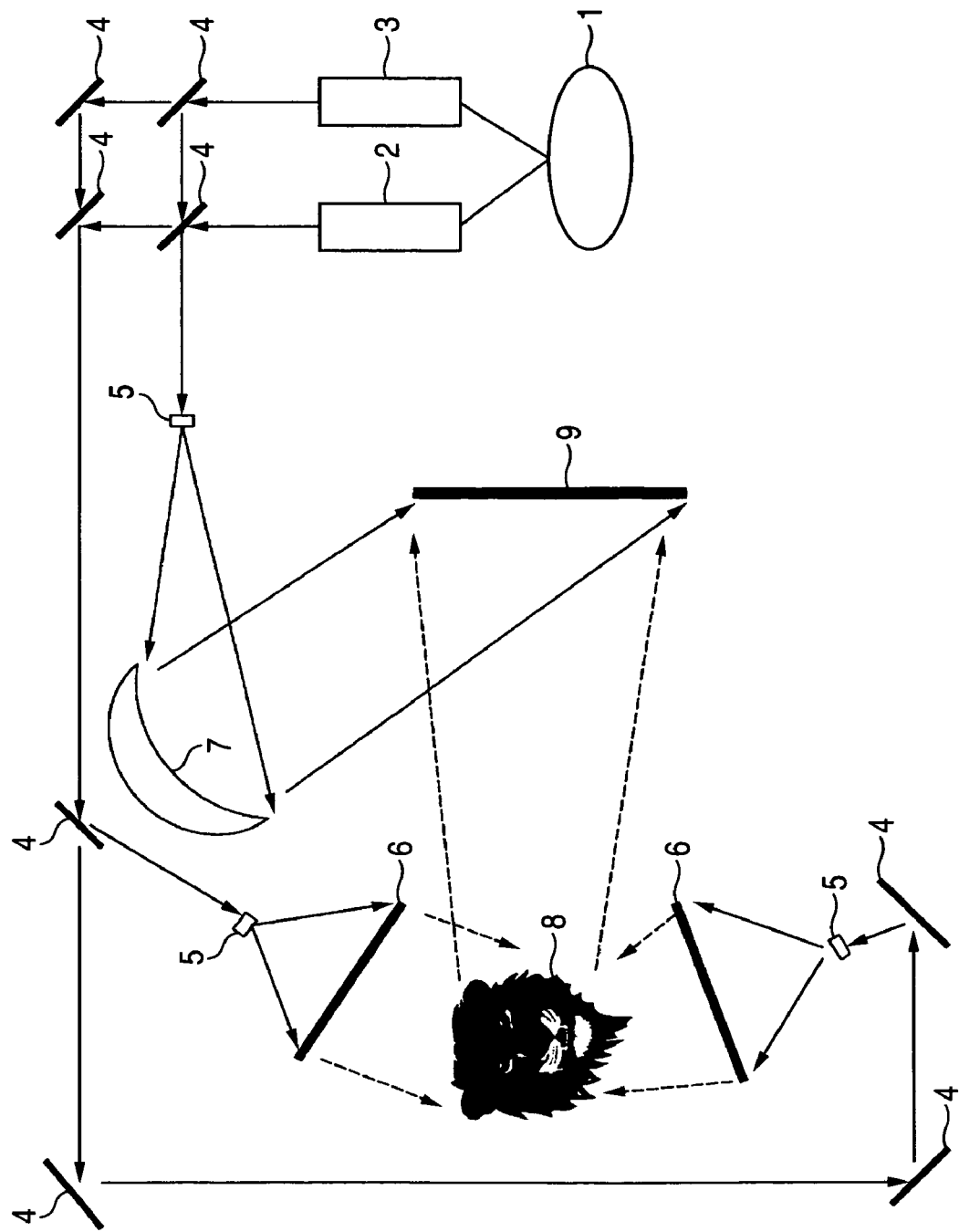
FIG. 1 shows an example of a holography system for recording a transmission hologram according to a non-limiting, illustrative embodiment of the invention.

Holographic silver halide photosensitive materials according to exemplary embodiments of the invention are described below.

The term "holographic silver halide photosensitive materials" as used in the invention refers to the silver halide photosensitive materials in which interference waves formed between object light and reference light can be recorded. In this wavefront recording, both amplitude and phase of the object light can be recorded, and the object can be reconstructed and reproduced faithfully as a three-dimensional image by use of reference light.

Each of the present holographic silver halide photosensitive materials has on a support at least one silver halide emulsion layer. The silver halide emulsion layer preferably contains silver halide particles spectrally sensitized with three or more varieties of spectral sensitizing dyes. And it is especially preferable that the silver halide particles spectrally sensitized with three of such spectral sensitizing dyes have at least two absorption maxima in the ranges of 500 nm to 550 nm and 600 nm to less than 700 nm, preferably in the ranges of 510 nm to 540 nm and 620 nm to 680 nm. The spectral absorption maxima are determined by measuring spectral transmittance of a photosensitive material with a general spectrophotometer, wherein the air is used as the reference. The number of spectral absorption maxima may be three or more, and there may be maxima of spectral absorption in wavelength regions other than those specified above.

It is appropriate that the maximum of spectral absorption (i.e., absorption maximum) in the region of 500 nm to 550 nm be from 0.1 to 0.5, preferably from 0.2 to 0.4, expressed in terms of transmission absorbance. The transmission absorbance is determined from measurements of spectral transmittance of a photosensitive material with a general spectrophotometer using the air as the reference. And it is also appropriate that the maximum of spectral absorption in the region of 600 nm to less than 700 nm be from 0.1 to 0.5, preferably from 0.2 to 0.4, expressed in terms of transmission absorbance. Such transmission absorbance can be determined similarly from measurements of spectral transmittance of a photosensitive material with a general spectrophotometer using the air as the reference. It is important to adjust the values of transmission absorbance at the spectral absorption maxima to the above-specified range. This is because too high transmission absorbance causes a reduction in sensitivity, while too high transmission absorbance makes it difficult to record an interference pattern uniform in thickness direction of a photosensitive material. In addition, Denisyuk-type holography using transmission light as light for irradiation of an object becomes difficult to perform, and versatility is impaired.

It is especially preferable that the spectral absorption maximum in the region of 500 nm to 550 nm is adjusted using at least one spectral sensitizing dye and the spectral absorption maximum in the region of 600 nm to less than 700 nm is adjusted using at least two spectral sensitizing dyes.

In the invention, it is appropriate that the total amount of sensitizing dyes used be from $1\times10^{-4}$ mole to $1\times10^{-2}$ mole per mole of silver in silver halide particles. Incorporation of sensitizing dyes in such a total amount can noticeably inhibit superfine particles of silver halide from becoming unstable by the use of a silver halide solvent.

Dyes generally usable in the invention include cyanine dyes, merocyanine dyes, complex cyanine dyes, complex merocyanine dyes, holopolar cyanine dyes, hemicyanine dyes, styryl dyes and hemioxonol dyes.

Any nuclei usually present in cyanine dyes can be basic heterocyclic nuclei of those dyes. More specifically, basic heterocyclic nuclei include a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus and a pyridine nucleus; nuclei formed by fusing together one of the above-recited nuclei and an alicyclic hydrocarbon ring; and nuclei formed by fusing together one of the above-recited nuclei and an aromatic hydrocarbon ring. Examples of these fused nuclei include an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus and a quinoline nucleus. Each of these nuclei may have a substituent on its constituent carbon atom.

Of acidic nuclei usually present in merocyanine dyes, heterocyclic rings formed of carbon, nitrogen and/or chalcogen (typically including oxygen, sulfur, selenium and tellurium) atoms, especially 5- or 6-membered nitrogen-containing heterocyclic rings formed of carbon, nitrogen and/or chalcogen (typically including oxygen, sulfur, selenium and tellurium) atoms, are favorable over others.

Examples of such acidic nuclei include 2-pyrazoline-5-one, pyrazolidine-3,5-dione, indazoline-5-one, hydantoin, 2- or 4-thiohydantoin, 2-iminooxazolidine-4-one, 2-oxazoline-5-one, 2-thioxazolidine-2,4-dione, 2-thioxazoline-2,4-dione, isooxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-one-1,1-dioxide, indoline-2-one, indoline-3-one, 2-oxoindazolinium, 3-oxoindazolium, 5,7-dioxo-6,7-dihydrothiazolo[3,2-a]pyrimidine, cyclohexane-1,3-dione, 3,4-dihydroisoquinoline-4-one, 1,3-dioxane-4,6-dione, barbituric acid, 2-thiobarbituric acid, chroman-2,4-dione, indazoline-2-one, pyrido[1,2-a]pyrimidine-1,3-dione, pyrazolo[1,5-b]quinazolone, pyrazolo[1,5-a]benzimidazole, pyrazolopyridone, 1,2,3,4-tetrahydroquinoline-2,4-dione, 3-oxo-2,3-dihydrobenzo[d]thiophene-1,1-dioxide and 3-dicyanomethine-2,3-dihydrobenzo[d]thiophene-1,1-dioxide nuclei.

Each of these acidic nuclei may fuse with another ring to form a whole, or may have a generally used substituent group.

Of those acidic nuclei, hydantoin, 2- or 4-thiohydantoin, 2-oxazoline-5-one, 2-thioxazoline-2,4-dione, thiazolidine-2,4-dione, rhodanine, thiazolidine-2,4-dithione, barbituric acid and 2-thiobarbituric acid are preferred over the others. Further preferable acidic nuclei are hydantoin, 2- or 4-thiohydantoin, 2-oxazoline-5-one, rhodanine, barbituric acid and 2-thiobarbituric acid, and the best ones are 2-thiohydantoin and rhodanine.

These sensitizing dyes are often used in combination with other dyes for the purpose of supersensitization. Typical examples of supersensitizing combinations are disclosed in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, British Patent Nos. 1,344,281 and 1,507,803, JP-B-43-4936, JP-B-53-12375, JP-A-52-110618 and JP-A-52-109925.

Dyes which can exhibit supersensitizing effect when used in combination with certain sensitizing dyes although they themselves do not have spectral sensitizing effect, or materials which can exhibit supersensitizing effect when used in combination with certain sensitizing dyes although they do not absorb visible light in a substantial sense may be added together with or separately from the spectral sensitizing dyes. In the invention, supersensitizers of stilbene type are used to particular advantage.

The addition timing of sensitizing dyes in the invention, though may be any stage in the making of silver halide emulsion particles, is preferably before the process of chemical sensitization, far preferably during the period from the completion of formation of silver halide particles to the start of desalting step. The addition of sensitizing dyes can be carried out using hitherto known methods, preferably in the form of aqueous solution or aqueous dispersion.

It is desirable that the present silver halide particles be from 10 nm to 80 nm in number average projected area diameter (i.e., number average diameter of circles equivalent to projected areas of the silver halide particles). And the number average projected area diameter is preferably from 20 nm to 60 nm, especially preferably from 30 nm to 50 nm. Too large particle sizes are generally responsible for image degradation in wavefront reconstruction, while too small particle sizes cause a failure to completely suppress instability of particles, such as changes in particle size. The invention enables holographic sensitive materials to have versatility by the setting of particle sizes within the foregoing range. The silver halide particles used in the invention are preferably monodisperse with respect to size distribution. The variation coefficient of circle-equivalent diameters based on projected areas (hereinafter referred to as projected-area diameters) of total silver halide particles is preferably 25% or less, far preferably 20% or less, particularly preferably 15% or less. Herein, the term "variation coefficient of projected-area diameters" is defined as the value obtained by dividing the standard deviation of a distribution of projected-area diameters among silver halide particles by an average projected-area diameter.

The projected-area diameters can be determined, e.g., using a direct method. Specifically, transmission electron microscope photographs of silver halide particles are taken, projected areas of individual particles are measured, and the diameters of circles having the same areas as the projected areas measured (projected-area diameters) are determined. Since the silver halide particles used in the invention are superfine particles, clear photographs of the particles can be taken with a high-voltage electron microscope under a low temperature condition.

The silver halide particles contained in the silver halide emulsion layer according to the invention preferably have a regular crystal form, including an octahedral form, a cubic form, a tetradecahedral form and rounded forms thereof. Of these forms, a rounded cubic form or a cubic form with sharp edges are favorable over the others. Twin crystal mixing therein is undesirable. And it is especially appropriate to control the mixing proportion of twin crystal particles to 3% or less, preferably 1% or less, on a number basis. The term "twin crystals" as used herein is intended to include single twin crystals, double twin crystals, multiple twin crystals, parallel twin crystals and non-parallel twin crystals.

The silver halide particles used in the invention are preferably silver bromide particles, silver iodobromide particles, silver chloroiodobromide particles or silver chlorobromide particles. Therein, it is particularly appropriate that the silver iodide content be from 1 mole % to 5 mole % and the silver chloride content be 5 mole % or less. And it is preferable that there is no distribution with respect to the silver iodide contents and the silver chloride contents in individual particles. Both variation coefficient of the silver iodide content distribution and that of the silver chloride content distribution among the particles are preferably 20% or less, especially preferably 10% or less. In general, EPMA method (Electron Probe Micro Analyzer method) is effective for measurements of the silver iodide content and the silver chloride content in each individual particle. Specifically, a sample prepared so as to contain emulsion particles in a dispersed condition that the particles are kept from contact with one another is irradiated with electron beams to emit X rays. The X rays emitted from the sample are analyzed, and thereby elemental analysis in the extremely minute areas irradiated with the electron beams can be made. Therein, it is appropriate that the measurements be performed while cooling the sample to a low temperature for the purpose of avoiding electron-beam damage thereto.

Since the silver halide particles used in the invention are superfine particles, it is not easy to have a halide composition structure built into the silver halide particles. However, it is possible to give silver halide particles a halide composition structure that the iodide content is high inside the particles or at the surface of the particles. In the chloride case also, it is possible to have the same structure as in the iodide case built into the particles. Moreover, it is possible to give the silver halide particles a multilayer structure made up of at least three layers.

The silver halide particles used in the invention can be prepared using hitherto known methods. They are preferably prepared by adding an aqueous solution of silver nitrate and an aqueous solution of silver halide to an aqueous solution of gelatin in accordance with a double jet method. Herein, it is appropriate that the solutions be added at increasing flow rates. And it is preferable to control the pH and the pAg of a reaction system during the addition. The suitable pAg is from 5 to 9. For preparation of superfine particles, low temperatures are favored, and the temperature range from 20° C. to 40° C. is especially advantageous. A wide variety of additives as mentioned hereinafter can be added for the purpose of particle size control, particle size distribution adjustment, sensitivity-fog balance, and gradation-development's progress balance.

The silver halide particles used in the invention are chemically sensitized. It is particularly desirable that gold-chalcogen sensitization and reduction sensitization be given to the silver halide particles during chemical sensitization. The term "chemical sensitization" as used herein means the process corresponding to a chemical sensitization step when the operation for making a silver halide emulsion is divided into three steps, namely a particle formation step, a washing step and a chemical sensitization step, according to the passage of time. And the chemical sensitization is defined as the process of ripening silver halide particles by adding various chemical sensitizers to the silver halide particles and causing a rise in temperature. By the concurrent performance of gold-chalcogen sensitization and reduction sensitization during the chemical sensitization, extremely high sensitivity can be achieved, and besides, it becomes possible to improve its keeping quality up to a level presenting no problem in practical use. Details of chalcogen sensitization and sensitization with noble metals are described in T. H. James, *The Theory of the Photographic Process*, 4th ed., pp. 67–76, Macmillan (1977). Further, as disclosed in *Research Disclosure*, vol. 120, No. 12008 (April, 1974), Research Disclosure, vol. 134, No. 13452 (June, 1976), U.S. Pat. Nos. 2,642,361, 3,297,446, 3,772,031, 3,857,711, 3,901,714, 4,266,018 and 3,904,415, and British Patent No. 1,315,755, combinations of chalcogen sensitizers (sulfur, selenium and tellurium sensitizers) and gold sensitizers can be further combined with platinum sensitizers, palladium sensitizers, iridium sensitizers or various combinations of these sensitizers under conditions that the pAg is from 5 to 120, the pH is from 5 to 8 and the temperature is from 30° C. to 80° C. For gold sensitization, known compounds including chloroauric acid, potassium chloroaurate, potassium aurithiocyanate, gold sulfide and gold selenide can be used. The term "palladium compound" is intended to include salts of divalent palladium and salts of tetravalent palladium. And the palladium compounds suitable for sensitizers are $R_2PdX_6$ or $R_2PdX_4$. Herein, R represents an alkali metal atom or an ammonium group, and X represents a halogen atom, specifically a chlorine atom, a bromine atom or an iodine atom. Suitable examples of such palladium compounds include $K_2PdCl_4$, $(NH_4)_2PdCl_6$, $Na_2PdCl_4$, $(NH_4)_2PdCl_4$, $Li_2PdCl_4$, $Na_2PdCl_6$ and $K_2PdBr_4$. It is preferable that the gold compounds and the palladium compounds are used in combination with thiocyanates or selenocyanates.

The sulfur compounds usable as sulfur sensitizers include hypo, thiourea compounds, rhodanine compounds and the sulfur-containing compounds as disclosed in U.S. Pat. Nos. 3,857,711, 4,266,018 and 4,054,457. The chemical sensitization can also be carried out in the presence of the so-called chemical sensitizing assistants. Examples of useful chemical sensitizing assistants include compounds known to suppress fogging and increase sensitivity during the process of chemical sensitization, such as azaindene, azapyridazine and azapyrimidine. Examples of modifiers for these chemical sensitizing assistants are disclosed in U.S. Pat. Nos. 2,131,038, 3,411,914 and 3,554,757, JP-A-58-126526, and G. F. Duffin, *Photographic Emulsion Chemistry*, pp. 138–143.

A suitable amount of gold sensitizers is from $1\times10^{-6}$ to $1\times10^{-2}$ mole, preferably from $1\times10^{-5}$ to $5\times10^{-3}$ mole, per mole of silver halide. A suitable addition range of palladium compounds is from $1\times10^{-3}$ to $5\times10^{-7}$ mole per mole of silver halide, and that of thiocyanate compounds or selenocyanate compounds is from $1\times10^{-4}$ to $5\times10^{-2}$ mole per mole of silver halide.

A suitable amount of sulfur sensitizers used for the silver halide particles according to the invention is from $1\times10^{-6}$ to $1\times10^{-2}$ mole, preferably from $1\times10^{-5}$ to $5\times10^{-3}$ mole, per mole of silver halide.

Selenium sensitization is suitable as chalcogen sensitization for the emulsions used in the invention. In the selenium sensitization, unstable selenium compounds hitherto known are used. Examples of selenium compounds which can be used include colloidal metallic selenium, selenoureas (e.g., N,N-dimethylselenourea, N,N-diethylselenourea), selenoketones and selenoamides. In some cases, a combination of selenium sensitization with sulfur sensitization is preferably used as chalcogen sensitization.

In tellurium sensitization, unstable tellurium compounds such as those disclosed in JP-A-4-224595, JP-A-4-271341, JP-A-4-333043, JP-A-5-303157, JP-A-6-27573, JP-A-6-175258, JP-A-6-180478, JP-A-6-208184, JP-A-6-208186, JP-A-6-317867, JP-A-7-140579, JP-A-7-301879 and JP-A-7-301880 can be used.

Specifically, unstable tellurium compounds such as phosphine telluride (e.g., n-butyl-diisopropylphosphine telluride, triisobutylphosphine telluride, tri-n-butoxyphosphine telluride, triisopropylphosphine telluride), diacyl (di)tellurides (e.g., bis(diphenylcarbamoyl) ditelluride, bis(N-phenyl-N-methylcarbamoyl) ditelluride, bis(N-phenyl-N-methylcarbamoyl) telluride, bis(N-phenyl-N-benzylcarbamoyl) telluride, bis(ethoxycarbonyl) telluride), telluroureas (e.g., N,N'-dimethylethylenetellurourea), telluroamides and telluro esters may be used. Of the compounds recited above, phosphine tellurides and diacyl (di)tellurides are preferred over the others.

During the chemical sensitization, it is desirable that the silver halide emulsions used in the invention undergo reduction sensitization in addition to gold-chalcogen sensitization. For the reduction sensitization, any of the method of adding reducing sensitizers to silver halide emulsions, the method referred to as silver ripening wherein the emulsion particles are ripened in the low pAg atmosphere of pAg 1–7 and the method referred to as high pH ripening wherein the emulsion particles are ripened in the high pH atmosphere of pH 8–11 may be chosen. Alternatively, two or more of these methods may be used in combination.

The method of adding reducing sensitizers is preferable in point of delicate controllability over the reduction sensitization level.

Examples of compounds known as reducing sensitizers include stannous salts, ascorbic acid and derivatives thereof, amine and polyamines, hydrazine derivatives, formamidinesulfinic acid, silane compounds and borane compounds. For the reduction sensitization carried out in the invention, one compound or a combination of two or more compounds selected from those known reducing sensitizers can be used. The compounds preferred as reducing sensitizers are stannous chloride, thiourea dioxide, dimethylaminebraone, ascorbic acid and derivatives thereof. The amount of reducing sensitizers to be added depends on emulsion-making conditions, so a good selection thereof is required. Specifically, it is appropriate to select the addition amount from the range of $10^{-7}$ to $10^{-3}$ mole per mole of silver halide.

The reducing sensitizers are dissolved in water or an organic solvent, such as alcohol compounds, glycols, ketones, esters and amides, and added during chemical sensitization. The addition timing of reducing sensitizers may be either before or after the addition of gold sensitizers and chalcogen sensitizers. However, it is preferable that reducing sensitizers are added first to ripen silver halide particles, and then chalcogen sensitizers and gold sensitizers are added to further ripen the silver halide particles, thereby completing chemical sensitization. In another preferable way, the solution of reducing sensitizers may be divided into several portions and added intermittently over several time, or it may be added continuously over a long time.

In the invention, it is advantageous that a tetrazaindene compound is used in an amount of $3\times10^{-3}$ to $3\times10^{-2}$ mole per mole of silver in silver halide particles. The tetrazaindene compounds usable in the invention are known as stabilizers or antifoggants for photographic emulsions, and described in *Research Disclosure*, vol. 307, p. 866. And tetrazaindene compounds having hydroxyl groups as substituents, especially hydroxytetrazaindene compounds, are suitable as the tetrazaindene compounds used in the invention. The hetero rings of these compounds may have substituents other than a hydroxyl group. Examples of such substituents include an alkyl group, an amino group, a hydroxyamino group, an alkylamino group, a dialkylamino group, an arylamino group, a carboxyl group, an alkoxycarbonyl group, a halogen atom, an acylamino group and a cyano group. On the other hand, it is undesirable for those compounds to have sulfur-containing substituents (e.g., a mercapto group).

Examples of a tetrazaindene compound suitable for the invention are listed below, but they should not be construed as being limited to these compounds alone.
1. 4-Hydroxy-6-methyl-1,3,3a,7-tetrazaindene
2. 4-Hydroxy-6-t-butyl-1,3,3a,7-tetrazaindene
3. 4-Hydroxy-6-phenyl-1,3,3a,7-tetrazaindene
4. 4-Hydroxy-1,3,3a,7-tetrazaindene
5. 4-Methyl-6-hydroxy-1,3,3a,7-tetrazaindene
6. 2-Methylthio-4-hydroxy-6-methyl-1,3,3a,7-tetrazaindene
7. 4-Hydroxy-5-bromo-6-methyl-1,3,3a,7-tetrazaindene
8. 4-Hydroxy-6-methyl-1,2,3a,7-tetrazaindene
9. 4-Hydroxy-6-ethyl-1,2,3a,7-tetrazaindene
10. 2,4-Dihydroxy-6-phenyl-1,3,3a,7-tetrazaindene
11. 4-Hydroxy-6-phenyl-1,2,3,3a,7-pentazaindene It is appropriate that these tetrazaindene compounds be added in an amount ranging from $3\times10^{-3}$ to $3\times10^{-2}$ mole, preferably from $4\times10^{-3}$ to $3\times10^{-2}$ mole, far preferably from $6\times10^{-3}$ to $2\times10^{-2}$ mole, per mole of silver halide, and the addition timing may be before the start of chemical sensitization, during or after the chemical sensitization, or at coating time.

When the addition amount is too small, tetrazaindene compounds cannot exert an appreciable effect against change in particle size with a lapse of time. The phrase "a lapse of time" means the time lapsed from the start or finish of preparation of silver halide emulsion particles to the coating of the emulsion prepared. By suppressing the change with a lapse of time, consistent preparation and quality of silver halide emulsion particles can be achieved. Addition of tetrazaindene compounds in a too large amount causes a great change in particle size with the lapse of time by contraries, compared with the case where no tetrazaindene compound is added. Accordingly, tetrazaindene compounds are strictly limited in their range of addition amount for achieving the effect the invention aims for, which therefore forms a discovery in preparation of silver halide emulsion particles for use in holography.

In the invention, it is appropriate that thiocyanates be added in an amount of $1\times10^{-4}$ to $1\times10^{-2}$ mole, preferably $5\times10^{-4}$ to $5\times10^{-3}$ mole, per mole of silver in silver halide particles. Addition of thiocyanates in a too small amount has little effect on enhancement of sensitivity, while their addition in a too large amount has a seriously detrimental effect on particle size stability because they act as silver halide solvents. Silver halide solvents other than thiocyanates can also be used to advantage. Examples of such silver halide solvents include (a) the organic thioethers as disclosed in U.S. Pat. Nos. 3,271,157, 3,531,286 and 3,574,628, JP-A-54-1019 and JP-A-54-158917, (b) the thiourea derivatives as disclosed in JP-A-53-82408, JP-A-55-77737 and JP-A-55-2982, (c) the silver halide solvents disclosed in JP-A-53-144319, each of which has a carbonyl group between an oxygen or sulfur atom and a nitrogen atom, (d) the imidazoles disclosed in JP-A-54-100717, (e) sulfites, and (f) ammonia.

The addition timing of thiocyanates suitably used in the invention, though may be in any stage of preparation of silver halide emulsion particles, is preferably after the finish of a process for forming silver halide particles, far preferably during the period from the finish of a desilvering process to the start of a coating process, especially preferably in the process of chemical sensitization.

Those thiocyanates are preferably added in the form of aqueous solution, and suitable examples thereof include KSCN, NaSCN and NH$_4$SCN.

In the invention, it is preferable that iridium salts are added in an amount of $1\times10^{-4}$ to $1\times10^{-2}$ mole per mole of silver in silver halide particles. The addition of iridium salts in such an amount range can greatly inhibit the spoilage of superfine silver halide particles' stability by the use of silver halide solvents. The especially effective addition amount of iridium salts is from $2\times10^{-4}$ to $1\times10^{-3}$ mole per mole of silver in silver halide particles.

The addition timing of iridium salts, though may be in any stage of preparation of silver halide emulsion particles, is preferably during the process of forming silver halide particles. A suitable way of adding iridium salts is to add them in the form of aqueous solution.

As the iridium salts used for the foregoing purpose, complexes of trivalent or tetravalent iridium are suitable. Typical examples of such complexes include K$_3$IrCl$_6$, K$_2$IrCl$_6$, K$_3$IrCl$_5$(H$_2$O) and K$_2$IrCl$_5$(H$_2$O). In addition to these potassium salts, the sodium and ammonium salts of those complex ions can also be used to advantage. In addition to Cl and H$_2$O, other ligands hitherto known can be also used as ligands for Ir. Specifically, iridium complexes containing the organic ligands disclosed in JP-A-7-072569 are preferably used. And the iridium complexes having cyano ligands as disclosed in JP-A-2-761027 are preferred by far.

In addition to an iridium salt as recited above, it is preferable that the silver halide particles used in the invention are doped with a hexacyano-metal complex. Suitable examples of the metal in such a complex include iron, ruthenium, osmium, cobalt, rhodium, iridium and chromium. A suitable amount of metal complexes added is from $10^{-6}$ to $10^{-2}$ mole, preferably from $10^{-5}$ to $10^{-3}$ mole, per mole of silver halide. The metal complexes can be added in a condition that they are dissolved in water or an organic solvent. Herein, it is advantageous to use an organic solvent miscible with water. Examples of such an organic solvent include alcohol compounds, ethers, glycols, ketones, esters and amides.

As metal complex ions, hexacyano-metal complex ions represented by the following formula (I) are especially suitable:

$$[M(CN)_6]^{n-} \quad (I)$$

(wherein M is iron, ruthenium, osmium, cobalt, rhodium, iridium or chromium, and n is 3 or 4).

Examples of such a hexacyano-metal complex ion are illustrated below:

(I-1) $[Fe(CN)_6]^{4-}$
(I-2) $[Fe(CN)_6]^{3-}$
(I-3) $[Ru(CN)_6]^{4-}$
(I-4) $[Os(CN)_6]^{4-}$
(I-5) $[Co(CN)_6]^{3-}$
(I-6) $[Rh(CN)_6]^{3-}$
(I-7) $[Ir(CN)_6]^{3-}$
(I-8) $[Cr(CN)_6]^{4-}$

As counter cations of these hexacyano-metal complex ions, it is advantageous to use ions easily miscible with water and fit for precipitation operation of silver halide emulsions. Examples of such counter cations include alkali metal ions (such as sodium, potassium, rubidium, cesium and lithium ions), an ammonium ion and alkylammonium ions.

It is desirable that the present holographic silver halide photosensitive materials contain low molecular-weight gelatin, preferably in silver halide emulsions as their constituents. The term "low molecular-weight gelatin" as used in the invention refers to the gelatin ranging in number average molecular weight from 3,000 to 50,000. And a more suitable range of the number average molecular weight is from 10,000 to 30,000. The gelatin used in the invention may be given various modifications as recited below. Examples of modified gelatin include phthaloylated, succinated, trimellitated or pyromellitated gelatin wherein amino groups are modified, esterified or amidated gelatin wherein carboxyl groups are modified, formylated gelatin wherein imidazolyl groups are modified, oxidation-treated gelatin wherein the number of methionine groups is reduced, and reduction-treated gelatin wherein the number of methione groups is increased.

In addition, hydrophilic colloids other than the foregoing gelatin can also be used. Examples of such hydrophilic colloids include proteins, such as gelatin derivatives, graft copolymers prepared from gelatin and other high polymers, albumin and casein; sugar derivatives, such as cellulose derivatives (e.g., hydroxyethyl cellulose, carboxymethyl cellulose, cellulose sulfate), sodium alginate and starch derivatives; and various kinds of synthetic hydrophilic high molecular substances, such as homo- or copolymers including polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole. Gelatin which may be used include not only lime-processed gelatin but also acid-processed gelatin and enzyme-processed gelatin as described in *Bull. Soc. Sci. Photo. Japan*, No. 16, p. 30 (1966). Alternatively, hydrolysis products of gelatin and enzymatic degradation products of gelatin can be used.

The silver halide emulsions used in the invention are generally subjected to washing. The washing temperature, though can be set depending on the end use purpose, is chosen preferably from the range of 5° C. to 50° C. The pH at washing time, though can also be set depending on the end use purpose, is chosen preferably from the range of 2 to 10, far preferably from the range of 3 to 8. Further, the pAg at washing time, though can also be set depending on the end use purpose, is chosen preferably from the range of 5 to 10. The washing can be carried out using a method selected from the noodle washing method, the dialysis using a semipermeable membrane, the centrifugal separation method, the coagulation sedimentation method or the ion exchange method. In the coagulating sedimentation method, a sulfate, an organic solvent, a water-soluble polymer or a gelatin derivative can be utilized.

The silver halide emulsions used in the invention can contain a wide variety of compounds for the purposes of preventing fog or stabilizing photographic properties during the production, storage or photographic processing of the photosensitive materials. Specifically, various compounds known as antifoggants or stabilizers can be added, with examples including azoles, such as thiazoles (e.g., benzothiazolium salts), nitroimidazoles, nitrobenzimidazoles, chlorobenzimidazoles, bromobenzimidazoles, mercaptothiazoles, mercaptobenzothiazozles, mercaptobenzimidazoles, mercaptothiadiazoles, aminotriazoles, benzotriazoles, nitrobezotriazoles and mercaptotetrzoles (especially 1-phenyl-5-mercaptotetrazole); mercaptopyrimidines; mercaptotriazines; thioketo compounds such as oxazolidinethione; and azaindenes, such as triazaindenes, tetrazaindenes (especially 4-hydroxy-substituted (1,3,3a,7)tetrazaindenes) and pentazaindenes. More specifically, the compounds disclosed in U.S. Pat. Nos. 3,954,474 and 3,982,947, and JP-B-52-28660 can be used. One of the compounds used to advantage is the compound disclosed in JP-A-63-212932. The antifoggants and the stabilizers can be added at various stages depending on the intended purposes, including the stage before particle formation, the particle formation stage, the stage after particle formation, the washing stage, the dispersion stage after washing, the stage before chemical sensitization, the chemical sensitization stage, the stage after chemical sensitization, and the stage before coating. Besides exerting their intrinsic antifogging and stabilizing effects by addition in emulsion-making process, those compounds can be used for many purposes, for example, control of crystal habit of particles, reduction of particle size, decrease in solubility of particles, control of chemical sensitization and control of alignment of dyes.

Depending on the intended purposes, it is preferable that the salts of metal ions is made to be present during the emulsion making in the invention, for example, in the stage of particle formation, in the desalting process, in the stage of chemical sensitization, or prior to coating operation. More specifically, the salts of metal ions are preferably added in the stage of particle formation when they are used for doping the particles, while it is preferable to add them after the particle formation or before the completion of chemical sensitization when they are used for modifying the particle surfaces or as chemical sensitizers. In doping the particles, a way of doping throughout the particles, a way of doping the particles in their core part alone, or a way of doping the particles in their shell part alone may be adopted. Examples of metals which may constitute those salts include Mg, Ca, Sr, Ba, Al, Sc, Y, La, Cr, Mn, Fe, Co, Ni, Cu, Zn, Ga, Ru, Rh, Pd, Re, Os, Ir, Pt, Au, Cd, Hg, Tl, In, Sn, Pb and Bi. These metals can be added in the form of salts enabling dissolution at the time of particle formation, such as ammonium salts, acetates, nitrates, sulfates, phosphates, hydroxides, six-coordinate complex salts or four-coordinate complex salts. Examples of such salts include $CdBr_2$, $CdCl_2$, $Cd(NO_3)_2$, $Pb(NO_3)_2$, $Pb(CH_3COO)_2$, $K_3[Fe(CN)_6]$, $(NH_4)_4[Fe(CN)_6]$, $K_3IrCl_6$, $(NH_4)_3RhCl_6$ and $K_4Ru(CN)_6$. The ligands of coordinate compounds can be chosen from halo, aquo, cyano, cyanato, thiocyanato, nitrosyl, thionitrosyl or carbonyl ligands. These metal compounds may be used alone, or as combinations of two or more thereof.

Those metal compounds are dissolved in water or an appropriate organic solvent such as methanol or acetone, and then added. For stabilization of these solutions, the way of adding a water solution of hydrogen halide (e.g., HCl, HBr) or alkali halide (e.g., KCl, NaCl, KBr, NaBr) can be adopted. Thereto, an acid or an alkali may be added, if needed. The metal compounds can be added to a reaction vessel before or at some midpoint of the particle formation. Alternatively, they can be added to a water solution of water-soluble silver salt (e.g., $AgNO_3$) or a water solution of alkali halide (e.g., NaCl, KBr, KI), and thereby they can be added continuously during the formation of silver halide particles. Further, a solution independent of the water-soluble silver salt and alkali halide is prepared, and continuous addition thereof may be started at an appropriate time during the particle formation. Furthermore, it is preferable that various addition methods are used in combination.

It is preferable to use oxidants for silver in emulsions according to the invention. The term "oxidants for silver" as used herein refers to the compounds having the function of acting on metallic silver to cause conversion into silver ion. Especially effective oxidants are compounds by which extremely fine silver particles produced secondarily in the stages of particle formation and chemical sensitization of silver halide particles can be converted into silver ions. The silver ions produced therein may form salts slightly soluble in water, such as silver halide, silver sulfide or silver selenide, or salts highly soluble in water, such as silver nitrate. The oxidants for silver may be inorganic substances or organic substances. Examples of inorganic oxidants include ozone, hydrogen peroxide and adducts thereof (such as $NaBO_2.H_2O_2.3H_2O$, $2NaCO_3.3H_2O_2$, $Na_4P_2O_7.2H_2O_2$ and $2Na_2SO_4.H_2O_2.2H_2O$), oxyacid salts including peroxo acid salts (such as $K_2S_2O_8$, $K_2C_2O_6$ and $K_2P_2O_8$), peroxo complex compounds (such as $K_2[Ti(O_2)C_2O_4].3H_2O$, $4K_2SO_4.Ti(O_2)OH.SO_4.2H_2O$ and $Na_3[VO(O_2)(C_2H_4)_2].6H_2O$), permanganates (such as $KMnO_4$) and chromates (such as $K_2Cr_2O_7$), halogen elements such as iodine or bromine, perhalogenic acid salts (such as potassium periodate), higher valent metal salts (such as potassium hexacyanoferrate(III)) and thiosulfonates.

On the other hand, examples of organic oxidants include quinones such as p-quinone, organic peroxides such as peracetic acid and perbenzoic acid, and compounds capable of releasing active halogens (such as N-bromosuccinimide, chloramine T and chloramine B).

The oxidants used suitably in the invention are inorganic oxidants including ozone, hydrogen peroxide and adducts thereof, halogen elements and thiosulfonates, and organic oxidants including quinones. The combination of reduction sensitization operation and the use of oxidants as recited above is a preferred mode, and it can be carried out using a way chosen from the way of performing reduction sensitization after using an oxidant, the reverse equivalent thereof, or the way of performing both concurrently. Any of these ways may be chosen and applied in the stage of particle formation or the stage of chemical sensitization.

It is preferable that the present holographic silver halide photosensitive materials preferably contain a dye having its spectral absorption maximum in the region of 550 to 600 nm, especially in the region of 560 to 590 nm. By the presence of such a dye, the photosensitive materials can be handled under an orange light, but not in the utter darkness, in spite of their high sensitivity to typical laser beams. Since the present photosensitive materials can be handled under an orange light, loads of handling at the time of taking holograms and during processing operations including development can be reduced and the versatility can be enhanced. The orange light can be easily obtained by equipping a light source with a filter through which light with wavelengths of 550 to 600 nm can pass. And it is appropriate that the spectral absorption maximum of the dye be in the range of 0.3 to 2.0, expressed in terms of transmission absorbance.

Although high transmission absorbance can enhance safety from a safelight and is favorable for handling under an orange light for many hours, the sensitivity to typical laser beams is lowered by the dye's absorption at its tail end. Accordingly, there is an appropriate transmission absorbance range. With this in view, the half width of dye's absorption is preferably 80 nm or less, far preferably 50 nm or less. These spectral absorption wavelengths and transmission absorbance values can be determined by measuring spectral transmittance of a photosensitive material with a general spectrophotometer using the air as the reference.

Any dyes can be used as long as they can meet the foregoing requirements. However, water-soluble dyes or solid disperse dyes which can be eluded or lose their colors by processing can be used to advantage. Of such dyes, water-soluble dyes having no adverse effects on photographic properties (including sensitivity) of silver halide emulsions are preferred over the others. Such water-soluble dyes can be added directly to silver halide emulsion layers, or may be added to protective or backing layers. Moreover, they may be used alone or as varying combinations. Typical examples of especially preferable dyes are illustrated below:

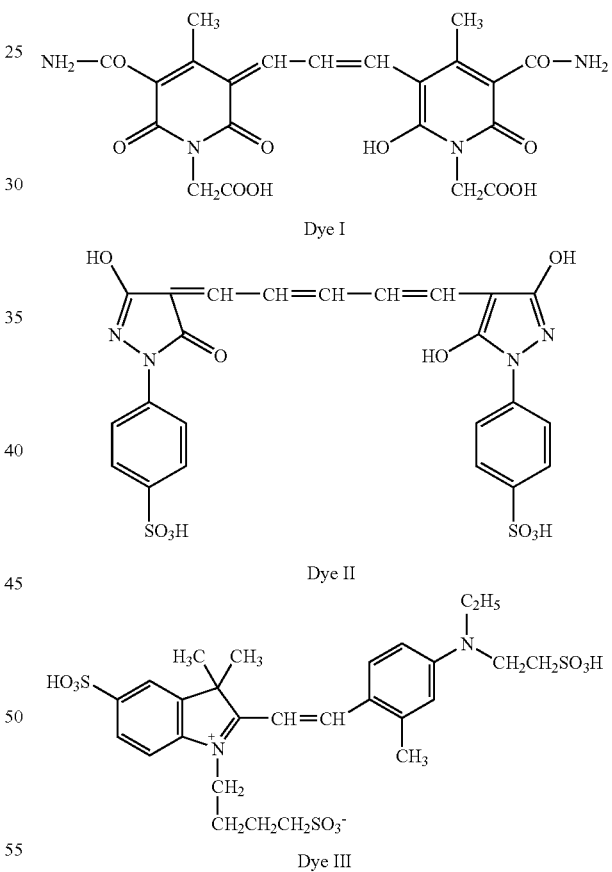

It is especially preferable that the present holographic silver halide photosensitive material contain the hydrazine compounds having silver halide adsorptive groups disclosed in JP-A-7-134351, the hydroxamic acid compounds disclosed in JP-A-8-114884 and JP-8-314051, the hydroxysemicarbazide compounds disclosed in JP-A-10-090819, or the hydroxylamine compounds having silver halide adsorptive groups disclosed in JP-A-2002-323729. The timing for addition of these compounds can be chosen from the period from the formation of emulsion particles until the coating thereof, preferably between the chemical sensitization time and the period from the finish of chemical sensitization to the start of coating. The addition amounts of those compounds may be determined arbitrarily. However, because of peculiarities of superfine particle emulsions, there are cases where the use of them in large excess amounts corresponding to 10 times or more the amounts disclosed in the references cited above is preferable. Their specific addition amounts can be easily determined by experiments.

In the present photosensitive materials, it is preferable to use a compound whose one-electron oxidation product formed by undergoing one-electron oxidation can release one or more than one electron. Specifically, such a compound is a compound selected from the compounds falling into Type 1 or Type 2 mentioned below.

(Type 1)

Compounds whose one-electron oxidation products formed by undergoing one-electron oxidation can further release one or more than one electron per each accompanied by subsequent bond-cleavage reaction.

(Type 2)

Compounds whose one-electron oxidation products formed by undergoing one-electron oxidation can further release one or more than one electron per each after undergoing subsequent bond-formation reaction.

Firstly, the compounds of Type 1 are illustrated.

Examples of a compound of Type 1 whose one-electron oxidation product formed by undergoing one-electron oxidation can further release one electron accompanied by subsequent bond-cleavage reaction include compounds referred to as "one-photon two-electron sensitizers" or "deprotonated electron-donating sensitizers" disclosed in JP-A-9-211769 (with examples including Compounds PMT-1 to S-37 shown in Tables E and F on pages 28 to 32), JP-A-9-211774, JP-A-11-95355 (with examples including Compounds INV 1 to 36), JP-T-2001-500996 (with examples including Compounds 1 to 74, 80 to 87 and 92 to 122, and the term "JP-T" as used herein means a published Japanese Translation of a PCT patent application), and in the patents including U.S. Pat. Nos. 5,747,235 and 5,747,236, EP-A1-786692 (with examples including Compounds INV 1 to 35), EP-A1-893732, and U.S. Pat. Nos. 6,054,260 and 5,994,051. Preferred ranges of these compounds are the same as those described in the references cited above.

Other examples of a compound of Type 1 whose one-electron oxidation product formed by undergoing one-electron oxidation can further release one or more electrons accompanied by subsequent bond-cleavage reaction include the compounds represented by the following formula (1) (the same as those of formula (1) disclosed in JP-A-2003-114487), the compounds represented by the following formula (2) (the same as those of formula (2) disclosed in JP-A-2003-114487), the compounds represented by the following formula (3) (the same as those of formula (1) disclosed in JP-A-2003-114488), the compounds represented by the following formula (4) (the same as those of formula (2) disclosed in JP-A-2003-114488), the compounds represented by the following formula (5) (the same as those of formula (3) disclosed in JP-A-2003-114488), the compounds represented by the following formula (6) (the same as those of formula (1) disclosed in JP-A-2003-75950), the compounds represented by the following formula (7) (the same as those of formula (2) disclosed in JP-A-2003-75950), the compounds represented by the following formula (8) (the same as those of formula (1) disclosed in Japanese Patent Application No. 2003-25886), and the compounds represented by the following formula (9) (the same as those of formula (3) disclosed in Japanese Patent Application No. 2003-33446) which are included in the compounds capable of causing reaction represented by the following chemical reaction scheme (1) (the same as the chemical reaction scheme (1) illustrated in Japanese Patent Application No. 2003-33446). Additionally, preferred ranges of these compounds are the same as those described in the references cited above.

Formula (1)

Formula (2)

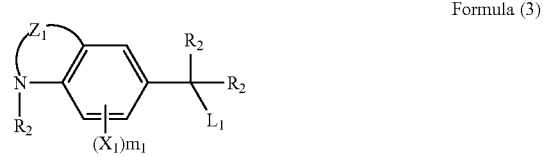

Formula (3)

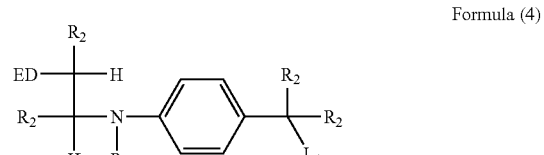

Formula (4)

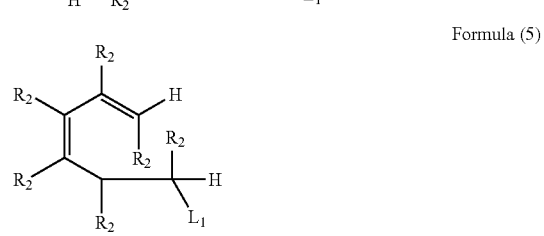

Formula (5)

Formula (6)

Formula (7)

Formula (8)

-continued

Chemical reaction scheme (1)

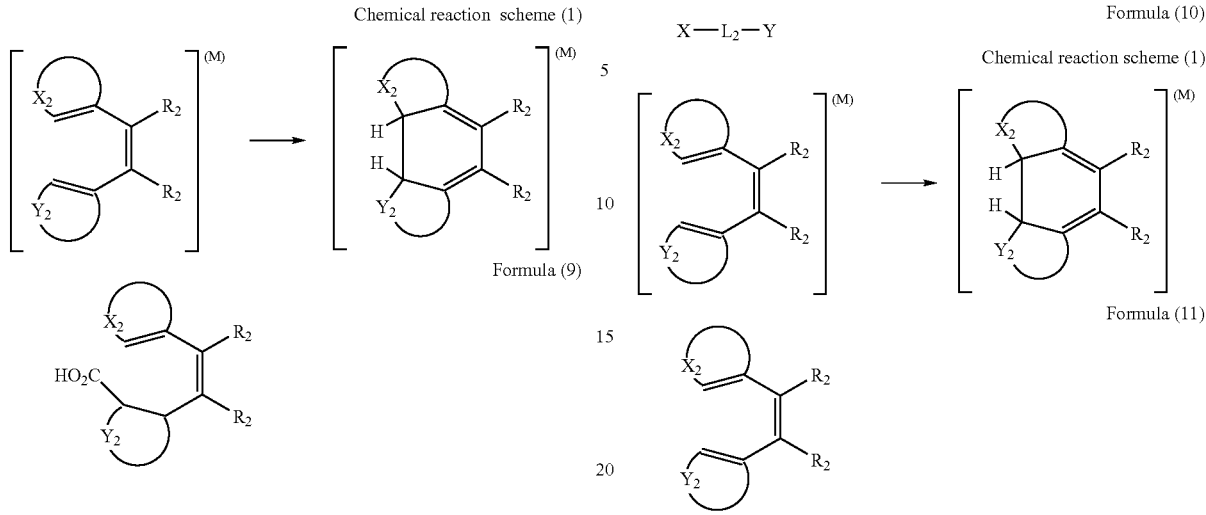

Formula (9)

Formula (10)

Chemical reaction scheme (1)

Formula (11)

In the above formulae, RED$_2$ represents a reducing group. R$_1$ represents a group of nonmetallic atoms forming a ring structure corresponding to the tetrahydro or octahydro body of a 5- or 6-membered aromatic ring (including an aromatic hetero ring) together with the carbon atom (C) and RED$_1$. R$_2$ represents a hydrogen atom or a substituent. When two or more R$_2$s are present in one molecule, they may be the same or different. L$_1$ represents a leaving group. ED represents an electron-donating group. Z$_1$ represents atoms forming a 6-membered ring together with the nitrogen atom and the two carbon atoms constituting the benzene ring. X$_1$ (in formula (3)) represents a substituent, and m$_1$ represents an integer of 0 to 3. Z$_2$ represents —CR$_{11}$R$_{12}$—, —NR$_{13}$— or —O—. Each of R$_{11}$ and R$_{12}$ independently represents a hydrogen atom or a substituent. R$_{13}$ represents a hydrogen atom, an alkyl group, an aryl group or a heterocyclic group. X$_1$ (in formula (8)) represents a alkoxy group, an aryloxy group, a heterocyclyloxy group, an alkylthio group, an arylthio group, a heterocyclylthio group, an alkylamino group, an arylamino group or a heterocyclylamino group. L$_2$ represents a carboxyl group or a salt thereof, or a hydrogen atom. X$_2$ represents a group forming a 5-membered hetero ring together with C═C. Y$_2$ represents a group forming a 5- or 6-membered aromatic ring or heterocyclic ring together with C═C. M represents a radical, a radical cation or a cation.

Secondly, compounds of Type 2 are illustrated.

Examples of a compound of Type 2 whose one-electron oxidation product formed by undergoing one-electron oxidation can further release one or more electrons after undergoing subsequent bond-formation reaction include the compounds represented by the following formula (10) (the same as those of formula (1) disclosed in JP-A-2003-140287), and the compounds represented by the following formula (11) (the same as those of formula (2) disclosed in Japanese Patent Application No. 2003-33446) which are included in the compounds capable of causing reaction represented by the following chemical reaction scheme (1) (the same as the chemical reaction scheme (1) illustrated in Japanese Patent Application No. 2003-33446). Additionally, preferred ranges of these compounds are the same as those described in the references cited above.

In the above formulae, X represents a reducing group capable of undergoing one-electron oxidation. Y represents a reactive group containing a carbon-carbon double bond moiety, a carbon-carbon triple bond moiety, an aromatic group moiety or a benzene-fused non-aromatic hetero ring moiety which can forming a new bond by reacting with a one-electron oxidation product formed by one-electron oxidation of X. L$_2$ represents a linkage group by which X and Y are linked. R$_2$ represents a hydrogen atom or a substituent. When two or more R$_2$s are present in one molecule, they may be the same or different. X$_2$ represents a group forming a 5-membered hetero ring together with C═C. Y$_2$ represents a group forming a 5- or 6-membered aromatic ring or heterocyclic ring together with C═C. M represents a radical, a radical cation or a cation.

The compounds suitable as the compounds of Type 1 and those of Type 2 are compounds having silver halide-adsorptive groups in their individual molecules or compounds having partial structures of spectral sensitizing dyes in their individual molecules. Typical examples of the silver halide-adsorptive groups present therein include the groups disclosed in JP-A-2003-156823, from 1st line on right column at page 16 to 12th line on right column at page 17. The partial structures of spectral sensitizing dyes present in those compounds include the structures shown in the reference cited above, from 34th line on right column at page 17 to 6th line on left column at page 18.

Of the compounds recited as those of Types 1 and 2, the compounds having at least one per molecule of silver halide-adsorptive group are preferable, and the compounds having at least two per molecule of silver halide-adsorptive groups are preferable by far. When two or more silver halide-adsorptive groups are present in single molecule, they may be the same or different.

Suitable examples of such a silver halide-adsorptive group include mercapto-substituted nitrogen-containing heterocyclic groups (such as a 2-mercapto-thiadiazolyl group, a 3-mercapto-1,2,4-triazolyl group, a 5-mercapto-tetrazolyl group, a 2-mercapto-1,3,4-oxadiazolyl group, a 2-mercaptobenzoxazolyl group, a 2-mercaptobenzothiazolyl group and a 1,5-dimethyl-1,2,4-triazolium-3-thiolate group), nitrogen-containing heterocyclic groups each of which has a —NH— group capable of forming iminosilver (>N—Ag) as their partial structure (such as a benzotriazolyl group, a benzimidazolyl group and an indazolyl group). Of these groups, 5-mercaptotetrazolyl, 3-mercapto-1,2,4-triazolyl and benzotriazolyl groups in particular are preferred. And the best ones are 3-mercapto-1,2,4-triazolyl and 5-mercaptotetrazolyl groups.

In addition, adsorptive groups having as partial structure two or more mercapto groups in their individual molecules are especially preferable, too. Herein, the mercapto (—SH) group may take a form of thione group as far as it can cause tautomerism. Suitable examples of an adsorptive group having two or more mercapto groups as its partial structure (such as a dimercapto-substituted nitrogen-containing heterocyclic group) include a 2,4-dimercaptopyrimidinyl group, a 2,4-dimercaptotriazinyl group and a 3,5-dimercapto-1,2,4-triazolyl group.

Further, quaternary salt structures of nitrogen or phosphorus are also suitable as adsorptive groups. Examples of a quaternary salt structure of nitrogen include ammonio groups (such as a trialkylammonio group, a dialkylaryl (or heteroaryl)ammonio group and an alkyldiaryl (or diheteroaryl)ammonio group) and quaternary nitrogen-containing heterocyclic groups. Examples of a quaternary salt structure of phosphorus include phosphonio groups (such as a trialkylphosphonio group, a dialkylaryl (or heteroaryl) phosphonio group, an alkyldiaryl (or diheteroaryl)phosphonio group and a triaryl (or triheteroaryl)phosphonio group). Of these groups, the quaternary salt structures of nitrogen are preferred. Further, 5- or 6-membered quaternary nitrogen-containing aromatic heterocyclic groups are used to advantage. And a pyridinio group, a quinolinio group and an isoquinolinio group are especially advantageous. These quaternary nitrogen-containing heterocyclic groups may have any substituents.

Examples of a counter anion for such a quaternary salt include a halide ion, a carboxylate ion, a sulfonate ion, a sulfuric acid ion, a perchloric acid ion, a carboxylic acid ion, a nitric acid ion, $BF_4^-$, $PF_6^-$ and $PhB^-$. When a group having negative charge, such as a carboxylate group, is present inside a molecule, an inner salt may be formed between such a group and the quaternary salt. As counter anions absent in molecules, a chloride ion, a bromide ion and a methanesulfonate ion are especially preferable.

A suitable structure of the compounds falling into Type 1 and Type 2, wherein quaternary salt structures are present as adsorptive groups, is represented by the following formula (X):

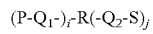

In formula (X), each of P and Q independently represents a quaternary salt structure of nitrogen or phosphorus, which is not a partial structure of sensitizing dye. Each of $Q_1$ and $Q_2$ independently represents a linkage group, with examples including a single bond, an alkylene group, an arylene group, a divalent heterocyclic group, —O—, —S—, —$NR_N$—, —C(=O)—, —$SO_2$—, —P(=O)— and combinations of two or more of those groups. Herein, $R_N$ represents a hydrogen atom, an alkyl group, an aryl group or a heterocyclic group. S represents a residue formed by removing one atom from a compound falling into Type 1 or Type 2. i and j are each an integer of 1 or more, and chosen from the range in which i+j is from 2 to 6. Herein, the cases where i is from 1 to 3 and j is 1 or 2 are preferable, the cases where i is 1 or 2 and j is 1 are preferable by far, and the case where i is 1 and j is 1 is especially preferable. The suitable total number of carbon atoms contained in a compound represented by formula (X) is from 10 to 100, preferably from 10 to 70, far preferably from 11 to 60, especially preferably from 12 to 50.

The compounds of Type 1 and Type 2 according to the invention may be used in any stages of emulsion-making time or during the process of producing sensitive materials. For instance, they may be used during the particle formation, in the desalting process, during the chemical sensitization, or in the stage before coating operation. In another way, they may be divided into portions and added over several times during those processes. The time suitable for the addition is in a period from the finish of particle formation till the start of a desalting process, during chemical sensitization (a period from just before the start to just after the finish of chemical sensitization), or in the stage before coating operation, preferably during chemical sensitization or in the stage before coating operation.

The compounds of Types 1 and 2 used in the invention are preferably dissolved in water, a water-soluble solvent such as methanol or ethanol, or a mixture thereof, and then added. In dissolving them in water, the compounds rising in solubility under high pH or under low pH may be dissolved in water increased or decreased in pH, respectively, and then used for addition.

Although the compounds of Type 1 and Type 2 are preferably used in silver halide emulsion layers, they may be added to a protective layer or an intermediate layer and permitted to diffuse out into the emulsion layers after coating of these layers. The time at which these compounds are added may be before or after the addition of sensitizing dyes, and each type of compounds are added to silver halide emulsion layers in an amount of $1 \times 10^{-9}$ to $5 \times 10^{-2}$ mole, preferably $1 \times 10^{-8}$ to $2 \times 10^{-3}$ mole, per mole of silver halide.

In the photosensitive materials of the invention, various additives as mentioned above are used, and various other additives can further be added in accordance with the desired purposes.

Such additives are described in greater detail in *Research Disclosure*, Item 17643 (December, 1978), Item 18716 (November, 1979) and Item 308119 (December, 1989). The locations where the additives are described in each of those references are listed below.

| Kinds of Additives | RD17643 | RD18716 | RD308119 |
|---|---|---|---|
| 1. Chemical sensitizer | p. 23 | p. 648, right column | p. 996 |
| 2. Sensitivity increasing agent | | " | |
| 3. Spectral sensitizer and Supersensitizer | pp. 23–24 | p. 648, right column p. 649, right column | 996 right to 998 right |
| 4. Brightening agent | p. 24 | p. 647, right column | 998 right |
| 5. Antifoggant and Stabilizer | pp. 24–25 | p. 649, right column | 998 right to 1000 right |

-continued

| Kinds of Additives | RD17643 | RD18716 | RD308119 |
| --- | --- | --- | --- |
| 6. Light absorbent, Filter dye, UV absorbent | pp. 25–26 | p. 649, right column to p. 650, left column | 1003 left to 1003 right |
| 7. Stain inhibitor | p. 25, right column | p. 650, left to right column | 1002 right |
| 8. Dye image stabilizer stabilizer | p. 25 | | 1002 right |
| 9. Hardener | p. 26 | p. 651, left column | 1004 right to 1005 left |
| 10. Binder | p. 26 | " | 1003 right to 1004 right |
| 11. Plasticizer, Lubricant | p. 27 | p. 650, right column | 1006 left to 1006 right |
| 12. Coating aid, Surfactant | pp. 26–27 | " | 1005 left to 1006 left |
| 13. Antistatic agent | p. 27 | " | 1006 right to 1007 left |
| 14. Matting agent | | | 1008 left to 1009 left |

For the purpose of preventing degradation in photographic properties from formaldehyde gas, it is favorable that compounds capable of reacting with formaldehyde to effect formaldehyde fixation are added to the photosensitive materials.

To the present photosensitive materials, it is preferable to add phenethyl alcohol or various other preservatives or fungicides disclosed in JP-A-63-257747, JP-A-62-272248 and JP-A-1-80941, such as 1,2-benzisothiazoline-3-one, n-butyl-p-hydroxybenzoate, phenol, 4-chloro-3,5-dimethylphenol, 2-phenoxyethanol and 2-(4-thiazolyl)benzimidazole.

Supports commonly used in silver halide photosensitive materials can be used, with typical examples including glass, TAC, PET and PEN. In the invention, however, it is preferable to use glass or TAC that is free of optical anisotropy. The support thickness can be chosen properly in accordance with its use and usage. The emulsion layers are coated on such a support. In addition to the emulsion layers, other layers chosen appropriately depending on the intended purposes, such as a protective layer, an YF layer, an intermediate layer, an anti-halation layer, a subbing layer and a backing layer, can be coated on the support. The coating of a backing layer is highly effective for maintaining curling properties of a flexible support such as TAC in a satisfactory condition. Further, introduction of a matting agent to the backing layer can reduce the possibility that sensitive materials will stick together when they have no protective layers. Furthermore, various troubles ascribable to static buildup, including adhesion of dust, can be positively precluded by control of static-prone property.

The silver halide emulsion layers and various other constituent layers have no particular restrictions as to their silver coverage and gelatin coverage. The suitable silver coverage is from 1 g/m$^2$ to 10 g/m$^2$. The suitable gelatin coverage is from 1 g/m$^2$ to 10 g/m$^2$. And the ratio of the silver coverage to the gelatin coverage can be chosen in an arbitrary range, but preferably chosen in the range of 0.3 go 2.0. The suitable thickness of coatings is generally from 3 µm to 12 µm. Too thin coatings make it impossible to perform recording by interference waves at an adequate level, while too thick coatings lower the resolution through an increase in scattering of light. The increment of thickness by swelling during processing steps can be determined freely by adjustment of hardener usage. Herein, it is preferable to achieve hardening to a degree high enough to cause no thickness change after processing, namely no effusion of silver halide and gelatin by processing. When the hardening is carried out on a layer-by-layer basis, it is preferable that the lower layer is hardened to a lower degree than the upper layer.

For the methods of recording interference-wave patterns in the present holographic silver halide photosensitive materials, the methods for processing the patterns recorded and those for regenerating them, and further the methods of utilizing them, holographic technologies and the most current findings in the scientific fields can be referred to. One of the representatives of reference books can be Toshihiro Kubota, *Holography Nyumon, Genri to Jissai*, Asakura Shoten (1995). As a matter of course, the applications described in such a reference book are adaptable to the present photosensitive materials, and the high sensitivity, high quality and high stability of the present photosensitive material can facilitate the applications.

Holographic silver halide photosensitive materials according to each embodiment of the invention are described below in detail.

FIRST EMBODIMENT

A silver halide-holographic sensitive material according to the first embodiment of the invention has on a support at least one silver halide emulsion layer, especially preferably at least two photosensitive silver halide emulsion layers including at least one green-sensitive silver halide emulsion layer having its absorption maximum in a range of 500 nm to 600 nm and at least one red-sensitive silver halide emulsion layer having its absorption maximum in a range of 600 nm to 750 nm. Although at least one blue-sensitive silver halide emulsion layer having its absorption maximum in a range of 350 nm to 500 nm may be provided additionally, the green-sensitive silver halide emulsion layer and/or the red-sensitive silver halide emulsion layer can double as the blue-sensitive silver halide emulsion layer. The expression "an emulsion layer has its absorption maximum in a range of 500 nm to 600 nm" means that an emulsion layer is spectrally sensitized with a spectral sensitizing dye and has only to have its absorption maximum or sensitivity maximum in at least the wavelength range of 500 nm to 600 nm. In other words, the emulsion layer may have two or more absorption or sensitivity maxima within the 500–600 nm range, or may have an additional absorption maximum or sensitivity maximum in a range other than such a range. And the expression "an emulsion layer has its absorption maximum in a range of 600 nm to 750 nm" means that an emulsion layer is spectrally sensitized with a spectral sensitizing dye and has only to have its absorption maximum or sensitivity maximum in at least the wavelength range of 600 nm to 700 nm. In other words, the emulsion layer may have two or more absorption or sensitivity maxima within the 600–750 nm range, or may have an additional absorption maximum or sensitivity maximum in a range other than such a range.

The green-sensitive silver halide emulsion layer and the red-sensitive silver halide emulsion layer may be arranged in any order. Namely, the green-sensitive silver halide emulsion layer may be disposed farther from the support, or the red-sensitive silver halide emulsion layer may be disposed farther from the support.

The silver halide particles used in the invention ranges in number average projected area diameter from 10 nm to 80 nm, preferably from 20 nm to 60 nm, especially preferably from 30 nm to 50 nm. In general, too large particle sizes result in the image quality being degraded in wavefront reconstruction, while too small particle sizes cause a failure to completely suppress instability of the particles, such as changes in particle size. The setting of particle sizes within the above-specified range in the invention enables the particles to undergo reduction sensitization in addition to gold-chalocogen sensitization during the chemical sensitization stage of silver halide particles. Further, too large particle sizes are attended with an increase in fog, and inhibit the enhancement of sensitivity. And what is worse, they are attended by serious degradation in storage stability.

The silver halide emulsions used in the invention are chemically sensitized. During the chemical sensitization, gold-chalcogen sensitization and reduction sensitization in particular are given to the silver halide emulsions. The term "chemical sensitization" as used herein means the process corresponding to a chemical sensitization step when the operation for making a silver halide emulsion is divided into three steps, namely a particle formation step, a washing step and a chemical sensitization step, according to the passage of time. And the chemical sensitization is defined as the process of ripening silver halide particles by adding various chemical sensitizers to the silver halide particles and causing a rise in temperature.

In the invention, it is preferable that a J-aggregate cyanine dye is incorporated as a sensitizing dye in an amount of $1 \times 10^{-4}$ to $1 \times 10^{-2}$ mole per mole of silver in silver halide particles. The incorporation of a J-aggregate cyanine dye in such an amount can markedly prevent the adverse effect on the stability of superfine silver halide particles that results from the use of a silver halide solvent. The term "J-aggregate dye" as used herein refers to the dye causing in the absorption maximum it shows in a solution state a 10 nm or more shift, preferably a 20 nm or more shift, to the long wavelength side by adsorption to silver halide particles. The especially suitable amount of a J-aggregate cyanine dye incorporated is from $5 \times 10^{-4}$ to $5 \times 10^{-3}$ mole per mole of silver in silver halide particles.

SECOND EMBODIMENT

A holographic silver halide photosensitive material according to the second embodiment of the invention has on a support at least one silver halide emulsion layer. Silver halide particles in the silver halide emulsion layer are spectrally sensitized with at least three varieties of spectral sensitizing dyes. And the silver halide particles spectrally sensitized with three varieties of sensitizing dyes preferably have two spectral absorption maxima in at least the wavelength region of 500 nm to 550 nm and the wavelength region of 600 nm to less than 700 nm, respectively. It is preferable by far that their spectral absorption maxima are in the 510–540 nm region and in the 620–680 nm region. The spectral absorption maxima are determined by measuring spectral transmittance of the photosensitive material with a general spectrophotometer, wherein the air is used as the reference. The number of spectral absorption maxima may be three or more, and there may be maxima of spectral absorption in wavelength regions other than those specified above.

The maximum of spectral absorption in the region between 500 nm and 550 nm is preferably from 0.1 to 0.5, far preferably from 0.2 to 0.4, expressed in terms of transmission absorbance. Such transmission absorbance is determined from measurements of spectral transmittance of the photosensitive material with a general spectrophotometer using the air as the reference. And the maximum of spectral absorption in the region of 600 nm to less than 700 nm is preferably from 0.1 to 0.5, far preferably from 0.2 to 0.4, expressed in terms of transmission absorbance. Similarly to the above, such transmission absorbance is also determined from measurements of spectral transmittance of the photosensitive material with a general spectrophotometer using the air as the reference. It is important to adjust the values of transmission absorbance at the spectral absorption maxima to the above-specified range. This is because too high transmission absorbance causes a reduction in sensitivity, while too high transmission absorbance makes it difficult to record an interference pattern uniform in thickness direction of the photosensitive material. In addition, Denisyuk-type holography using transmission light as light for irradiation of an object becomes difficult to perform, and versatility is impaired.

Although it is generally thought that two types of spectral sensitizing dyes might be enough to provide two spectral absorption maxima in the ranges of 500 nm to 550 nm and 600 nm to less than 700 nm, one of our findings is in that the use of at least three spectral sensitizing dyes are required for conferring versatility including high sensitivity to every typical laser upon the photosensitive material. It is especially preferable that one spectral absorption maximum is adjusted to the region of 500 nm to 550 nm by use of at least one spectral sensitizing dye and the other spectral absorption maximum is adjusted to the region of 600 nm to less than 700 nm by use of at least two spectral sensitizing dyes.

THIRD EMBODIMENT

A holographic silver halide photosensitive material according to the third embodiment of the invention has on a support at least one silver halide emulsion layer. The silver halide emulsion layer contains low molecular-weight gelatin having a weight average molecular weight of 3,000 to 50,000 and gelatin having a weight average molecular weight of 80,000 or more. And it is preferable that the weight average molecular weight of the low molecular-weight gelatin contained therein is from 5,000 to 30,000 and that of the other gelatin is 100,000 or more. In general, gelatin is a mixture mainly containing α-chain gelatin having a molecular weight of 95,000, β-chain gelatin having a molecular weight of 190,000 and γ-chain gelatin having a molecular weight of 285,000. The weight average molecular weight of such gelatin can be determined by a light scattering method or a centrifugal separation method. Alternatively, it is convenient for determination of weight average molecular weight to adopt gel permeation chromatography utilizing calibration with standard samples of known molecular weight. The details thereof are described in T. H. James, *The Theory of Photographic Process,* 4th. Ed., pp. 51–85. The low molecular-weight gelatin for use in the invention can be obtained by decomposition of general gelatin with an appropriate enzyme. The molecular weight distribution of gelatin thus decomposed is preferably narrow. In other words, it is preferable that the weight average molecular weight of the gelatin obtained is close to its number average molecular weight. When the molecular weight of low molecular-weight gelatin is too low, the gelatin is eluted quickly by processing to result in hard control of the space between interference fringes, or the film thickness. On the other hand, when the molecular weight of low molecular-weight gelatin is too high, the elution of gelatin by processing is difficult, so it takes a long time for change in space between interference fringes, or film thickness, to result in impairment of uniformity.

In the silver halide emulsion layer, the proportion of the low molecular-weight gelatin having a weight average molecular weight of 3,000 to 50,000 to the gelatin having a weight average molecular weight of 80,000 or more is preferably from 1:10 to 1:1 by weight, especially preferably from 1:8 to 1:2 by weight. The higher the proportion (by weight) of the low molecular-weight gelatin, the greater the amount of gelatin eluted during processing and the easier it becomes to lessen the space between interference fringes at the time of reproduction, compared with the space between the interference fringes at the time of recording. Conversely, when the proportion of low molecular-weight gelatin is too high by weight, it becomes difficult to equalize the space between interference fringes at the time of reproduction with the space between the interference fringes at the time of recording. By setting the proportions of two types of gelatin within the foregoing range by weight, it becomes possible to arbitrarily control the space between interference fringes through the extension of processing time, including a washing time. In other words, the invention enables arbitrary control of the spaces in interference patterns by devising the composition of gelatin necessary to be used as binder of silver halide particles, not by adding any additives undesirable to the sensitivity of silver halide particles.

It is preferable that the silver halide emulsion layer containing the low molecular-weight gelatin having a weight average molecular weight of 3,000 to 50,000 and the gelatin having a weight average molecular weight of 80,000 or more is subjected in advance to hardening treatment. The hardening treatment is important for retention of film strength during storage under high humidity, upon exposure and during processing. The invention is based on the finding that, even when the hardening treatment is performed in advance, only the low molecular-weight gelatin is given priority in effusion into processing solutions during processing. Thus, even elution of gelatin with respect to the thickness of the emulsion layer becomes possible, and uniform spacing in interference patterns can be achieved. In addition, sufficient film strength can be attained since the hardening treatment is performed in advance. The hardening treatment is preferably carried out to an extent that the film thickness after the hardening treatment becomes greater than the film thickness before the hardening treatment by a factor of 1.3 to 3, especially by a factor of 1.5 to 2.5. Too strong hardening causes retardation of processing, and too weak hardening results in insufficient film strength. Hardeners suitable for the foregoing purpose are organic hardeners. Well-known organic hardeners, such as aldehydes, N-methylols, protected aldehydes, ketones, carboxylic acids, carbamic acids, sulfonate esters, sulfonyl halides, active halogen-containing compounds, s-triazines, epoxides, aziridines, active olefins, protected active olefins, isocyanates, carbodiimides and polymers, can be used alone or as mixtures of two or more thereof. It is preferable that those hardeners are added to a silver halide emulsion layer or another layer at the coating time of the silver halide emulsion layer, thereby attaining the hardening.

Although the escape of gelatin during the processing can be changed according to the degree of hardening, this method is not compatible with the attainment of sufficient film strength. The combined use of the low molecular-weight gelatin having a weight average molecular weight of 3,000 to 50,000 and the gelatin having a weight average molecular weight of 80,000 or more according to the invention enables compatibility between the control of film thickness change during processing and the attainment of sufficient film strength. The gelatin for use in the invention may be given a wide variety of modifications as recited below. Examples of modified gelatin usable in the invention include phthaloylated, succinated, trimellitated or pyromellitated gelatin in which amino groups are modified, esterified or amidated gelatin in which carboxyl groups are modified, formylated gelatin wherein imidazolyl groups are modified, oxidation-treated gelatin wherein the number of methionine groups is reduced, and reduction-treated gelatin wherein the number of methione groups is increased.

Supports commonly used in silver halide photosensitive materials can be used in the invention also. Typical examples thereof include glass, triacetyl cellulose (TAC), PET and PEN. In the invention, however, it is preferable to use TAC that is free of optical anisotropy. The use of optical anisotropy-free TAC is favorable for recording of interference patterns because the polarized direction of light passing through the support is retained. A suitable thickness of the support is from 100 μm to 300 μm, especially from 150 μm to 250 μm. By setting the support thickness within the foregoing range, handling suitability of the support is enhanced. The film supports have advantages over the glass support in price, weight, pliability and cracking resistance. However, when the film support is too thin, the sensitive material moves at the time of recording of interference patterns thereon. On the other hand, too thick film support suffers a loss of its features.

In the invention, it is preferable that at least one backing layer is provided on the side of the support opposing the silver halide emulsion layer(s), and what is more, a ratio of a total amount of gelatin coated for the backing layer to a total amount of gelatin coated for the silver halide emulsion layer(s) is from 0.3 to 1.0, especially from 0.5 to 0.8. The thus specified backing layer can effectively control the curling of the present photosensitive materials using film supports. In the case of the present photosensitive material that has a silver halide emulsion layer containing low molecular-weight gelatin having a weight average molecular weight of 3,000 to 50,000 and gelatin having a weight average molecular weight of 80,000 or more, the thickness of the emulsion layer can be changed arbitrarily by processing, so for prevention against a curl variation sensitive to the change in thickness of the emulsion layer it is favorable to provide the backing layer which is of limited gelatin coverage. As the gelatin incorporated in the backing layer, a mixture of low molecular-weight gelatin having a weight average molecular weight of 3,000 to 50,000 and gelatin having a weight average molecular weight of 80,000 or more is usable and suitable as in the case of the emulsion layer. The suitable mixing proportion between these two types of gelatin is in the same range as in the emulsion layer.

In the invention, it is preferable that the backing layer contains a matting agent. Although it is possible to add a matting agent to a silver halide emulsion layer or a protective layer provided on a silver halide emulsion layer, the addition of a matting agent to the backing layer alone is beneficial to the invention. The addition of a matting agent to the silver halide emulsion layer or the protective layer provided on the emulsion layer suppress elution of low molecular-weight gelatin from the silver halide emulsion layer according to the invention and brings about unevenness in film thickness change. In other words, the matting agent is added to the backing layer in order to make the most of the invention's features. Further, the matting agent can noticeably inhibit silver halide photosensitive materials from sticking together, but the use of the matting agent in the emulsion layer makes it impossible to record interference fringes in the areas where the matting agent is present. In addition, even when the matting agent is added to a protective layer provided on the emulsion layer, scattering of light deteriorates by the thickness of the protective layer. Both suppression of light scattering and prevention of sticking can be achieved by the use of a matting agent on the side of backing layer.

It is appropriate that the backing layer be made up of two layers, an electrically conductive layer and a layer into which a matting agent is introduced. By incorporation of conductive particulates, such as fine particles of tin oxide, into the conductive layer, electrification, especially under a low-humidity condition, can be prevented and dust adhesion troubles at interference pattern-recording time can be avoided markedly. In other words, such a conductive layer can improve both recording characteristic and handling suitability. The matting agent used to advantage is fine particles of polymethyl methacrylate. A suitable size of such fine particles is from 1 µm to 5 µm. Particles of too small sizes cannot exert their effect on prevention of sticking, and those of too large sizes increase scattering of light. The size range of 2 µm to 4 µm is especially preferred, and the distribution among particle sizes is preferably monodisperse.

In addition to the emulsion layer(s) and the backing layer, a protective layer, a YF layer, an intermediate layer, an anti-halation layer and an undercoat layer may be coated as appropriate for the intended purposes. The silver halide emulsion layer(s) and various other layers have no particular restrictions as to silver coverage and gelatin coverage. However, it is preferable that the silver coverage is from 1 g/m² to 10 g/m² and the gelatin coverage is from 1 g/m² to 10 g/m². The silver/gelatin content ratio can be chosen from an arbitrary range. A suitable range of such a ratio is from 0.3 to 2.0. A suitable coating thickness is generally from 3 µm to 12 µm. When the coating thickness is too thin, recording of interference waves cannot be made at a satisfactory level; while, when the coating thickness is too thick, scattering of light increases to result in lowering of resolution.

The invention enables production of holographic silver halide photosensitive materials with more excellent interference pattern-recording and reproducing characteristics than were previously possible by using as a support a triacetyl cellulose film ranging in thickness from 150 µm to 300 µm, incorporating low molecular-weight gelatin having a weight average molecular weight of 3,000 to 50,000 and gelatin having a weight average molecular weight of 80,000 or more in a silver halide emulsion layer, setting the ratio of total gelatin coverage of the backing layer to total gelatin coverage of the silver halide emulsion layer(s) within a range of 0.3 to 1.0, and adding a matting agent to the backing layer. However, it has been found that, when the low molecular-weight gelatin was used in a silver halide emulsion layer, pressure fog developed by a matting agent under a condition that photosensitive materials stick together offered problems in some cases. Further, it has been revealed that this problem came up markedly in a special case where no protective layer was provided on the silver halide emulsion layer. And marked reduction of this pressure fog has been discovered to be possible by incorporation of a radical scavenger into the emulsion layer.

The term "radical scavenger" as used in the invention refers to the compound that substantially extinguishes the color of galvinoxyl (or reduces absorbance at 430 nm) when the mixture of a 0.05 mmoldm$^{-3}$ ethanol solution of galvinoxyl and a 2.5 mmoldm$^{-3}$ ethanol solution of the compound tested, which is prepared at a temperature of 25° C. or less in accordance with the stopped flow method, is examined for change of absorbance at 430 nm with respect to time. (When it is impossible to dissolve a compound to be tested in the aforesaid concentration, the absorbance measurement may be made in a condition that the compound concentration is lowered.) Compounds suitable as radical scavenger in the invention are the compounds whose galvinoxyl color extinction rate constants determined in accordance with the foregoing method are 0.01 mmol$^{-1}$s$^{-1}$dm$^3$ or more, preferably 0.1 mmol$^{-1}$s$^{-1}$dm$^3$ or more. Methods for determining a radical scavenging rate by use of galvinoxyl are described in *Microchemical Journal*, 31, 18–21 (1985), and the stopped flow method is described, e.g., in *Bunkou Kenkyu*, vol. 19, No. 6, p. 321 (1970). In the invention, it is preferable to use as a radical scavenger one of the compounds represented by the following formulae (A-I) to (A-V). Of these compounds, those represented by formula (A-I) or (A-II) are preferred over the others.

Formula (A-I)

Formula (A-II)

Formula (A-III)

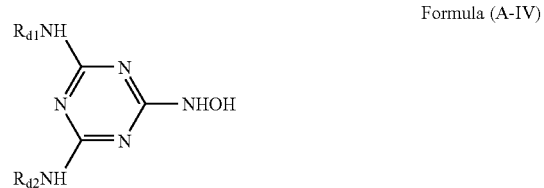

Formula (A-IV)

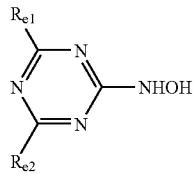

Formula (A-V)

In formula (A-I), $R_{a1}$ represents an alkyl group, an alkenyl group, an aryl group, an acyl group, an alkyl- or arylsulfonyl group, an alkyl- or arylsulfinyl group, a carbamoyl group, a sulfamoyl group, an alkoxycarbonyl group or an aryloxycarbonyl group, and $R_{a2}$ represents a hydrogen atom or a group represented by $R_{a1}$. However, when $R_{a1}$ is an alkyl group, an alkenyl group or an aryl group, $R_{a2}$ is an acyl group, an alkyl- or arylsulfonyl group, an alkyl- or arylsulfinyl group, a carbamoyl group, a sulfamoyl group, an alkoxycarbonyl group or an aryloxycarbonyl group. Alternatively, $R_{a1}$ and $R_{a2}$ may combine with each other to form a 5- to 7-membered ring. In formula (A-II), X represents a heterocyclic group, and $R_{b1}$ represents an alkyl group, an alkenyl group or an aryl group. Alternatively, X and $R_{b1}$ may combine with each other to form a 5- to 7-membered ring. In formula (A-III), Y represents nonmetal atoms forming a 5-membered ring together with —N═C—. Alternatively, Y may represents nonmetal atoms forming a 6-membered ring together with the group —N═C—, wherein the end of Y on the side bonding to the carbon atom of —N═C— is a group selected from —N($R_{c1}$)—, —C($R_{c2}$)($R_{c3}$)—, —C($R_{c4}$)═, —O— or —S— (which is bonded to the carbon atom of —N═C— on the left side thereof). Each of $R_{c1}$ to $R_{c4}$ represents a hydrogen atom or a substituent. In formula (A-IV), $R_{d1}$ and $R_{d2}$ may be the same or different, and each of them represents an alkyl group or an aryl group. Herein, however, the alkyl group contains at least 8 carbon atoms when both $R_{d1}$ and $R_{d2}$ are unsubstituted alkyl groups and they are identical with each other. In formula (A-V), $R_{e1}$ and $R_{e2}$ may be the same or different, and each of them represents a hydroxylamino group, a hydroxyl group, an amino group, an alkylamino group, an arylamino group, an alkoxy group, an aryloxy group, an alkylthio group, an arylthio group, an alkyl group or an aryl group, exclusive of the case where both $R_{e1}$ and $R_{e2}$ are represented by —NH$R_{e3}$ (wherein $R_{e3}$ is an alkyl or aryl group).

The compounds represented by formulae (A-I) to (A-V) are described below in greater detail.

In formula (A-I), $R_{a1}$ represents an alkyl group (preferably an alkyl group containing 1 to 36 carbon atoms, such as methyl, ethyl, i-propyl, cyclopropyl, butyl, isobutyl, cyclohexyl, t-octyl, decyl, dodecyl, hexadecyl or benzyl), an alkenyl group (preferably an alkenyl group containing 2 to 36 carbon atoms, such as allyl, 2-butenyl, isopropenyl, oelyl or vinyl), an aryl group (preferably an aryl group containing 6 to 40 carbon atoms, such as phenyl or naphthyl), an acyl group (preferably an acyl group containing 2 to 36 carbon atoms, such as acetyl, benzoyl, pivaloyl or α-(2,4-di-tert-amylphenoxy)butyryl, myristoyl, stearoyl, naphthoyl, m-pentadecylbenzoyl or isonicotinoyl), an alkyl- or arylsulfonyl group (preferably an alkyl- or arylsulfonyl group containing up to 36 carbon atoms, such as methanesulfonyl, octanesulfonyl, benzenesulfonyl or toluenesulfonyl), an alkyl- or arylsulfinyl group (preferably an alkyl- or arylsulfinyl group containing up to 40 carbon atoms, such as methanesulfinyl or benzenesulfinyl), a carbamoyl group (including N-substitued carbamoyl groups, preferably a carbamoyl group containing 1 to 40 carbon atoms such as N-ethylcarbamoyl, N-phenylcarbamoyl, N,N-dimethylcarbamoyl or N-butyl-N-phenylcarbamoyl), a sulfamoyl group (including N-substituted sulfamoyl groups, preferably a sulfamoyl group containing 1 to 40 carbon atoms such as N-methylsulfamoyl, N,N-diethylsulfamoyl, N-phenylsulfamoyl, N-cyclohexyl-N-phenylsulfamoyl or N-ethyl-N-dodecylsulfamoyl), an alkoxycarbonyl group (preferably an alkoxycarbonyl group containing 2 to 36 alkoxycarbonyl group, such as methoxycarbonyl, cyclohexyloxycarbonyl, benzyloxycarbonyl, isoamyloxycarbonyl or hexadecyloxycarbonyl), or an aryloxycarbonyl group (preferably an aryloxycarbonyl group containing 7 to 40 carbon atoms, such as phenoxycarbonyl or naphthoxycarbonyl). $R_{a2}$ represents a hydrogen atom or a group recited above as $R_{a1}$. In formula (A-II), X represents a heterocyclic group (specifically a univalent group derived from a 5- to 7-membered hetero ring whose constituent atoms include at least one nitrogen, sulfur, oxygen or phosphorus atom and whose bonding site is preferably on its carbon atom, such as 1,3,5-triazine-2-yl, 1,2,4-triazine-3-yl, pyridine-2-yl, pyrazinyl, pyrimidinyl, purinyl, quinolyl, imidazolyl, 1,2,4-triazole-3-yl, benzimidazole-2-yl, thienyl, furyl, imidazolidinyl, pyrrolinyl, tetrahydrofuryl, morpholinyl or phosphinoline-2-yl). $R_{b1}$ has the same meaning as $R_{a1}$ in formula (A-I), and represents an alkyl group, an alkenyl group or an aryl group. In formula (A-III), Y represents nonmetal atoms forming a 5-membered ring together with the group —N═C— (wherein the group derived from the ring formed is e.g., imidazolyl, benzimidazolyl, 1,3-thiazole-2-yl, 2-imidazoline-2-yl, purinyl or 3H-indole-2-yl). Alternatively, Y represents nonmetal atoms forming a 6-membered ring together with the group —N═C—, wherein the end of Y on the side bonding to the carbon atom of the group —N═C— is a group selected from —N($R_{c1}$)—, —C($R_{c2}$)($R_{c3}$)—, —C($R_{c4}$)═, —O— or —S— (which is bonded to the carbon atom of —N═C— on the left side thereof). $R_{c1}$ to $R_{c4}$ may be the same or different, and each of them represents a hydrogen atom or a substituent (such as an alkyl group, an alkenyl group, an aryl group, an alkoxy group, an aryloxy group, an alkylthio group, an arylthio group, an alkylamino group, an arylamino group, or a halogen atom). Examples of a 6-membered ring group formed from Y include quinolyl, isoquinolyl, phthalazinyl, quinoxalinyl, 1,3,5-triazine-5-yl and 6H-1,2,5-thiadiazine-6-yl. In formula (A-IV), $R_{d1}$ and $R_{d2}$ each represent an alkyl group (preferably an alkyl group containing 1 to 36 carbon atoms, such as methyl, ethyl, i-propyl, cyclopropyl, n-butyl, isobutyl, hexyl, cyclohexyl, t-octyl, decyl, dodecyl, hexadecyl or benzyl) or an aryl group (preferably an aryl group containing 6 to 40 carbon atoms, such as phenyl or naphthyl). Herein, however, the alkyl group contains at least 8 carbon atoms when both $R_{d1}$ and $R_{d2}$ are unsubstituted alkyl groups and they are identical with each other. In formula (A-V), $R_{e1}$ and $R_{e2}$ each represent a hydroxylamino group, a hydroxyl group, an amino group, an alkylamino group (preferably an alkylamino group containing 1 to 50 carbon atoms, such as methylamino, ethylamino, diethylamino, methylethylamino, propylamino, dibutylamino, cyclohexylamino, t-octylamino, dodecylamino, hexadecylamino, benzylamino or benzylbutylamino), an arylamino group (preferably an arylamino group containing 6 to 50 carbon atoms, such as phenylamino, phenylmethylamino, diphenylamino or naphthylamino), an alkoxy group (preferably an alkoxy group containing 1 to 36 carbon atoms, such as methoxy, ethoxy, butoxy, t-butoxy, cyclohexyloxy, berzyloxy, octyloxy, tridecyloxy or hexadecyloxy), an aryloxy group (preferably an aryloxy group containing 6 to 40 carbon atoms, such as phenoxy or naphthoxy), an alkylthio group (preferably an alkylthio group containing 1 to 36 carbon atoms, such as methylthio, ethylthio, i-propylthio, butylthio, cyclohexylthio, benzylthio, t-octylthio or dodecylthio), an arylthio group (preferably an arylthio group containing 6 to 40 carbon atoms, such as phenylthio or naphthylthio), an alkyl group (preferably an alkyl group containing 1 to 36 carbon atoms, such as methyl, ethyl, propyl, butyl, cyclohexyl, i-amyl, sec-hexyl, t-octyl, dodecyl or hexadecyl), or an aryl group (preferably an aryl group containing 6 to 40 carbon atoms, such as phenyl or naphthyl). Herein, however, the case where $R_{e1}$ and $R_{e2}$ are both represented by —NHR (wherein R is an alkyl or aryl group) is not included. $R_{a1}$ and $R_{a2}$ may combine with each other to form a 5- to 7-membered ring, and X and $R_{b1}$ may also combine with each other to form a 5- to 7-memberd ring. Examples of a 5- to 7-membered ring formed from those groups include a succinimide ring, a phthalimide ring, a triazole ring, an urazole ring, a hydantoin ring and a 2-oxo-4-oxazolidinone ring. Each of the groups in the compounds represented by formulae (A-I) to (A-V) may further have substituents. Examples of such substituents include an alkyl group, an alkenyl group, an aryl group, a heterocyclic group, a hydroxyl group, an alkoxy group, an aryloxy group, an alkylthio group, an arylthio group, an amino group, an acylamino group, a sulfonamido group, an alkylamino group, an arylamino group, a carbamoyl group, a sulfamoyl group, a sulfo group, a carboxyl group, a halogen atom, a cyano group, a nitro group, a sulfonyl group, an acyl group, an alkoxycarbonyl group, an aryloxycarbonyl group, an acyloxy group and a hydroxyamino group. In formula (A-I), it is preferable that $R_{a2}$ is a hydrogen atom, an alkyl group, an alkenyl group or an aryl group and $R_{a1}$ is an acyl group, a sulfonyl group, an sulfinyl group, a carbamoyl group, a sulfamoyl group, an alkoxycarbonyl group or an aryloxycarbonyl group. The compounds of formula (A-I) wherein each $R_{a2}$ is an alkyl or aryl group and each $R_{a1}$ is an acyl, sulfonyl, carbamoyl, sulfamoyl, alkoxycarbonyl or aryloxycarbonyl group are preferred over the others. And the compounds of formula (A-I) wherein each $R_{a2}$ is an alkyl group and each $R_{a1}$ is an acyl group are used to particular advantage. In formula (A-II), $R_{b1}$ is preferably an alkyl group or an alkenyl group, far preferably an alkyl group.

X in formula (A-II) is preferably a group forming a compound represented by the following formula (A-II-1), far preferably a 1,3,5-triazine-2-yl group, especially preferably a group forming a compound represented by the following formula (A-II-2). In formula (A-II-1), $R_{b1}$ has the same meaning as in formula (A-II), and $X_1$ represents nonmetal atoms forming a 5- or 6-membered ring. The compounds represented by formula (A-II-1) wherein each $X_1$ forms a 5- or 6-membered aromatic heterocyclic ring are used to advantage.

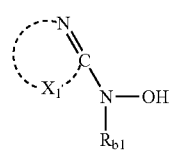

Formula (A-II-1)

-continued

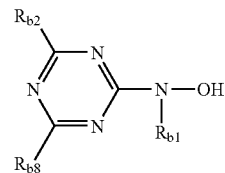

Formula (A-II-2)

In formula (A-II-2), $R_{b1}$ has the same meaning as in formula (A-II). $Rb_2$ and $R_{b3}$ may be the same or different, and they each represent a hydrogen atom or a substituent. Of the compounds represented by formula (A-II-2), the cases where each of $R_{b2}$ and $R_{b3}$ is a hydroxyamino group, a hydroxyl group, an amino group, an alkylamino group, an arylamino group, an alkoxy group, an aryloxy group, an alkylthio group, an arylthio group, an alkyl group or an aryl group are preferred over the others. Of the compounds represented by formula (A-III), the cases where Y represents atoms forming a 5-membered ring are preferred, and the cases where Y is a constituent of a 5-membered ring and its end on the side bonding to the group —N═C— is a nitrogen atom are preferable by far. Herein, the case where Y forms an imidazoline ring is especially advantageous. The imidazoline ring formed from Y may be fused together with a benzene ring. In the case of the compounds represented by formula (A-IV), it is preferable that $R_{d1}$ and $R_{d2}$ are alkyl groups. In the case of the compounds represented by formula (A-V), on the other hand, it is preferable that $R_{e1}$ and $R_{e2}$ are groups selected from hydroxyamino groups, alkylamino groups or alkoxy groups. Therein, it is especially preferable that $R_{e1}$ is a hydroxyamino group and $R_{e2}$ is an alkylamino group. Of the compounds represented by formulae (A-I) to (A-V), those containing 15 or less carbon atoms per molecule have an advantage in that they can exert their action on layers other than the layers to which they are added, while the compounds containing 16 or more carbon atoms per molecule are favorable for the purpose of exerting their action on only the layers to which they are added. Among the compounds represented by formulae (A-I) to (A-V), those represented by formulae (A-I), (A-II), (A-IV) and (A-V) are preferable to those represented by formula (A-III), those represented by formulae (A-I), (A-IV) and (A-V) are preferable by far, and those represented by formulae (A-I) and (A-V) are particularly preferable. Examples of the compounds represented by formulae (A-I) to (A-V) are illustrated below, but the invention should not be construed as limiting to these examples.

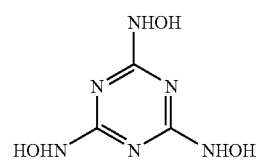

A-1

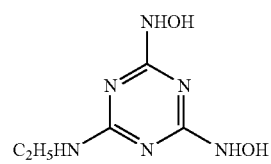

A-2

-continued
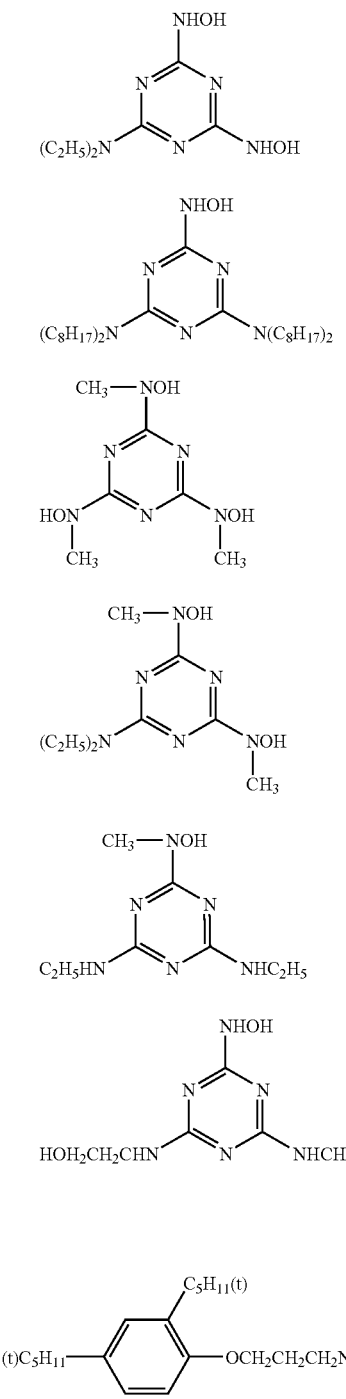
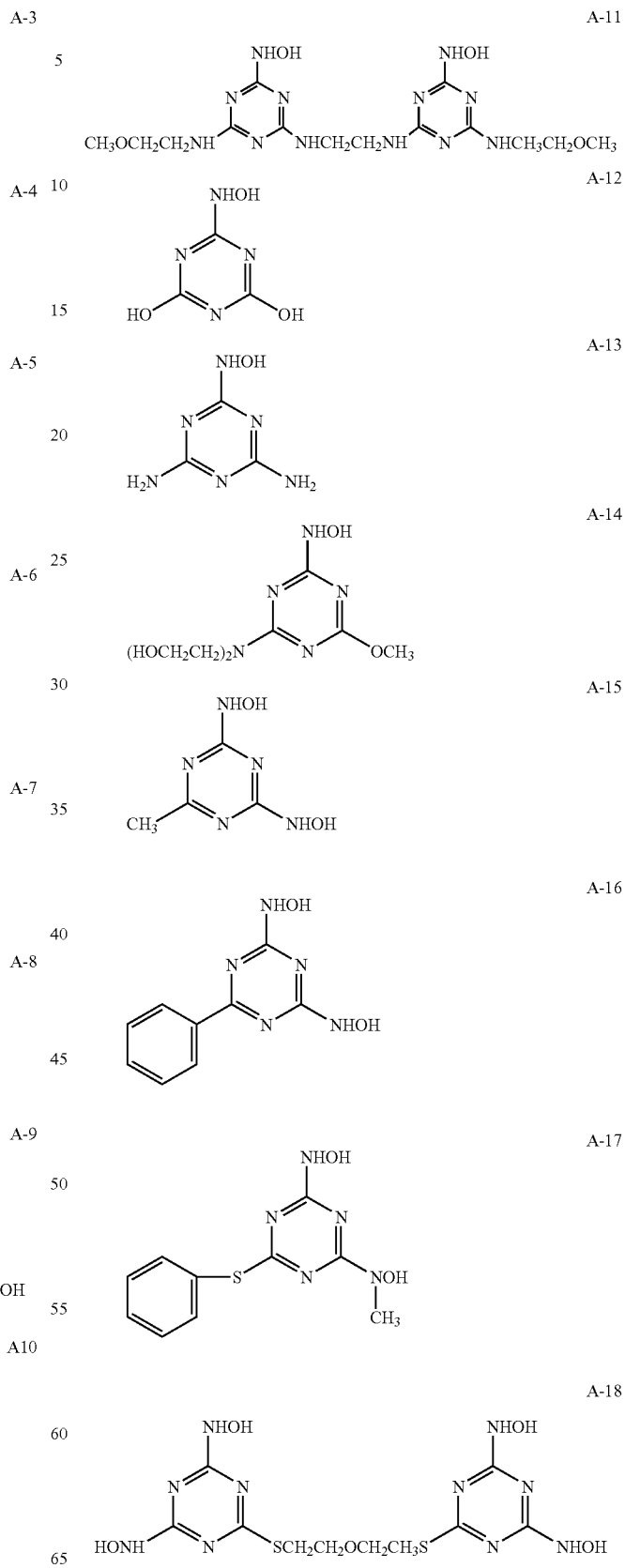

-continued
A-19
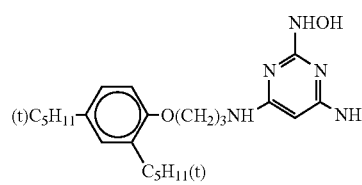
A-20
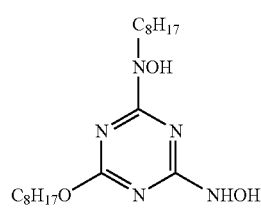
A-21
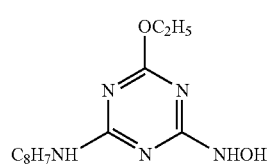
A-22
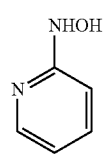
A-23
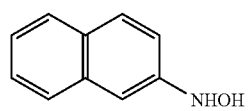
A-24
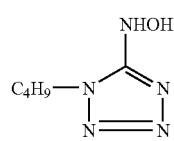
A-25
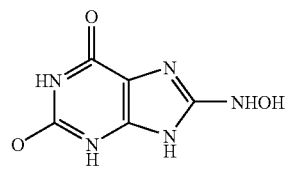
A-26
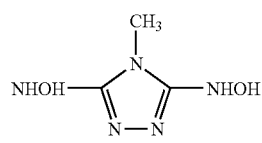
A-27
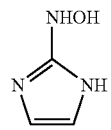
A-28
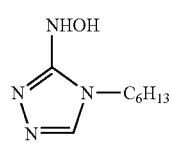
-continued
A-29
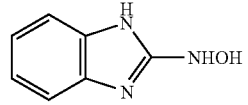
A-30
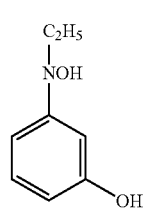
A-31
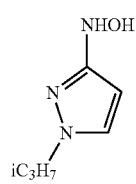
A-32
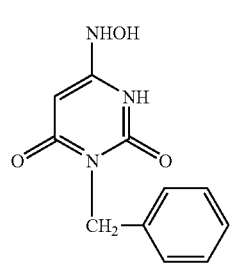
A-33
A-34
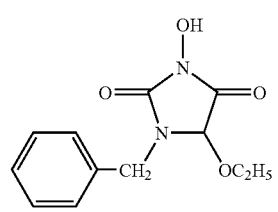
A-35
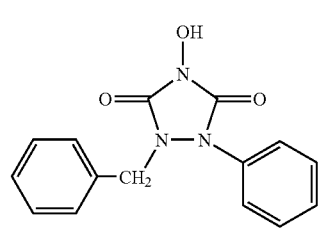
A-36
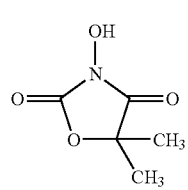

-continued

A-37 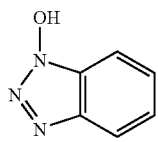

A-38 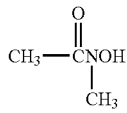

A-39 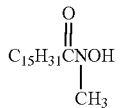

A-40 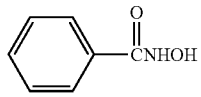

A-41 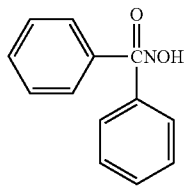

A-42 

A-43 

A-44 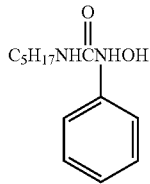

A-45 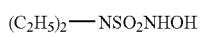

A-46 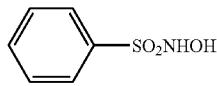

A-47 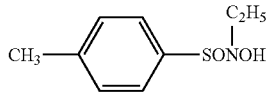

A-48 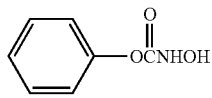

A-49 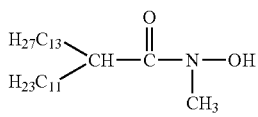

-continued

A-50

$$C_{14}H_{29}{}^{(n)}OCCH_2CH_2CONOH \text{ with } CH_3$$

A-51

$$C_{18}H_{37}{}^{(n)}OCCH_2CHC-NOH,\ C_{18}H_{35},\ CH_3$$

A-52

$$C_{18}H_{37}{}^{(n)}OCCHCH_2C-NOH,\ C_{18}H_{35},\ CH_3$$

A-53

$$C_{16}H_{33}OCCH_2CHC-NOH,\ C_{18}H_{37}{}^{(n)},\ CH_3$$

A-54

$$C_{16}H_{33}OCCHCH_2C-NOH,\ C_{16}H_{33},\ CH_3$$

A-55

$$C_{18}H_{37}OCCH_2CH_2C-NOH,\ CH_3$$

The corresponding relationship between the compounds illustrated above and the foregoing formulae (A-I) to (A-V) are as follows:

| Compounds | Formula |
|---|---|
| A-33 to A-55 | Formula (A-I): |
| A-5 to A-7, A-10, A-20, A-30 | Formula (A-II): |
| A-21 to A-29, a-31, A-32 | Formula (A-III): |
| a-8, A-11, A-19 | Formula (A-IV): |
| A-1 to A-4, A-9, A-12 to A-18 | Formula (A-V): |

These compounds used in the invention can be synthesized easily using the methods as described in *J. Org. Chem.*, 27, 4054 ('62), *J. Amer. Chem. Soc.*, 73, 2981 ('61) and JP-B-49-10692, or the methods according thereto. In the invention, the compounds represented by formulae (A-I) to (A-V) may be dissolved in water, a water-soluble solvent such as methanol or ethanol, or a mixture thereof, or may be emulsified and dispersed in such a solvent as recited above, and then added. In the cases of dissolving them in water, the compounds rising in solubility under high pH or under low pH may be dissolved in water increased or decreased in pH, respectively, and then used for addition. Of the compounds represented by formulae (A-I) to (A-V), two or more types thereof may be used in combination. These radical scavengers are preferably incorporated in the emulsion layer(s). A suitable amount of radical scavengers used is from $1\times10^{-4}$ to $5\times10^{-2}$ mole, preferably from $5\times10^{-4}$ to $1\times10^{-2}$ mole, per mole of silver. And it is preferable that the radical scavenger are added to the silver halide emulsion or emulsions during the chemical sensitization.

The present system for taking holographic images by use of the present silver halide photosensitive materials is illustrated below.

The invention uses only two different pulsed lasers, namely a pulsed laser having its emission wavelength in a region of 500 nm to less than 600 nm and a pulsed laser having its emission wavelength in a region of 600 nm to less than 700 nm, while synchronizing these two pulsed lasers. As the pulsed laser having its emission wavelength in a region of 500 nm to less than 600 nm, it is appropriate to use those having their individual coherent length of 10 cm or more, preferably 50 cm or more. And those having an emission time of $10^{-6}$ second or less, preferably $10^{-7}$ second or less, can be used to advantage. As long as the emission time is in such a range, continuous emission may be performed or alternating emission and quench may be repeated during the time period. The output is preferably from 10 mJ to 2,000 mJ. The beam diameter and the divergence angle and polarization degree of the laser beam can be chosen depending on an optical system used. Under these conditions, interference patterns for taking portraits can be favorably recorded with safety. To be more specific, the second harmonic of pulsed YAG laser, 532 nm, can be used to advantage.

As the pulsed laser having its emission wavelength in a region of 600 nm to less than 700 nm, it is appropriate to use those having their individual coherent length of 50 cm or more, preferably 1 m or more. And those having an emission time of $10^{-6}$ second or less, preferably $10^{-7}$ second or less, can be used to advantage. As long as the emission time is in such a range, continuous emission may be performed or alternating emission and quench may be repeated during the foregoing time period. The output is preferably from 10 mJ to 2,000 mJ. The beam diameter and the divergence angle and polarization degree of the laser beam can be chosen depending on an optical system used. Under these conditions, interference patterns for taking portraits can be favorably recorded with safety. To be more specific, pulsed Ruby laser, 694 nm, can be used to advantage.

Only those two different pulsed lasers are used in a synchronized state. Even three-dimensional pictures taken with only two color varieties of light, namely green light and red light, they can be seen as nearly full-color three-dimensional pictures to human eye. Three-color exposure with additional blue light is not practical because it makes the taking system complex and expensive. The expression "using two different lasers while synchronizing them" as used herein means that two different laser beams are emitted within the time of preferably $10^{-6}$ second or less, far preferably $10^{-7}$ second or less (to $10^{-12}$ second or more). When the time interval between the two emissions is $10^{-3}$ or more, a discrepancy between a green image and a red image becomes conspicuous.

In the invention, transmission holograms are recorded at two different wavelengths in a sheet of silver halide photosensitive material. In a usual way, on the other hand, photosensitive materials responding individually to different wavelengths are bonded together and submitted to use, but such bonding is complicated. Therefore, it is difficult in the usual way to make three-dimensional pictures available at low prices which the invention aims. For achieving the invention's aim, it is required to use a silver halide photosensitive material highly sensitive to both green light and red light. The expression "highly sensitive silver halide photosensitive material" as used herein means the material that enables recording under preferably 500 µJ/cm$^2$ or less, far preferably 100 µJ/cm$^2$. The present picture-taking system cannot be completed unless the material has high sensitivity to both green light and red light. The present Inventors have found that preparation of a silver halide photosensitive material highly sensitive to both green light and red light was feasible.

The invention provides a holography system, preferably a system for taking portraits in accordance with holography. Herein, the objects of portraits may include animals and plants in addition to persons, or may be animals or plants alone. Further, they may be inanimate objects.

FIG. 1 shows an example of a system for taking holographic images through recording of transmission holograms according to the invention. By use of combinations (4) including prisms, reflectors and semitransmissive-and-semireflective mirrors, laser light beams from two different lasers (2, 3) are subjected to optical axis alignment, and each beam is split into an object beam and a reference beam. Herein, the arrow-marked solid lines and broken lines represent beam pathways. The lasers are synchronized with a synchronization circuit (1). The object beams and the reference beams are scaled up through object lenses and spatial filters (5). The object beams are preferably converted to diffuse light by diffusion plates (6) and illuminate an object (8). In addition, illumination from at least two directions, especially from three or more directions, is preferred. As to the reference beams, it is preferable that they illuminate a sensitive material (9) at an incident angle of 45 degrees from the direction of rearward and upward side of the object (a person). In addition, it is advantageous that the reference beams are collimated beams, so a concave mirror (7) is used to advantage.

The invention provides a system for taking portraits in accordance with holography, wherein reflection holograms are recorded at two different wavelength in a sheet of silver halide photosensitive material, preferably from the transmission holograms mentioned above, by using two different pulsed lasers alone, namely a pulsed laser having its emission wavelength in a region of 500 nm to less than 600 nm and a pulsed laser having its emission wavelength in a region of 600 nm to less than 700 nm, while synchronizing the two pulsed lasers. These reflection holograms enable enjoyment of three-dimensional pictures in normal lighting. As the pulsed laser having its emission wavelength in a region of 500 nm to less than 600 nm, it is appropriate to use those having their individual coherent length of 10 cm or more, preferably 50 cm or more. And those having an emission time of $10^{-3}$ second or less, preferably $10^{-5}$ second or less, can be used to advantage. As long as the emission time is in such a range, continuous emission may be performed or alternating emission and quench may be repeated during the time period. The output is preferably from 10 mJ to 1,000 mJ. The beam diameter and the divergence angle and polarization degree of the laser beam can be chosen depending on an optical system used. Under these conditions, interference patterns can be favorably recorded. To be more specific, the second harmonic of pulsed YAG laser, 532 nm, can be used to advantage.

As the pulsed laser having its emission wavelength in a region of 600 nm to less than 700 nm, it is appropriate to use those having their individual coherent length of 10 cm or more, preferably 30 cm or more. And those having an emission time of $10^{-3}$ second or less, preferably $10^{-5}$ second or less, can be used to advantage. As long as the emission time is in such a range, continuous emission may be performed or alternating emission and quench may be repeated during the foregoing time period. The output is preferably from 10 mJ to 1,000 mJ. The beam diameter and the divergence angle and polarization degree of the laser beam can be chosen depending on an optical system used. Under these conditions, interference patterns can be favorably recorded. To be more specific, pulsed Ruby laser, 694 nm, can be used to advantage.

Only those two different pulsed lasers are used in a synchronized state. The expression "using two different lasers while synchronizing them" as used herein means that two different laser beams are emitted within the time of preferably $10^{-3}$ second or less, far preferably $10^{-5}$ second or less.

Figure 2:
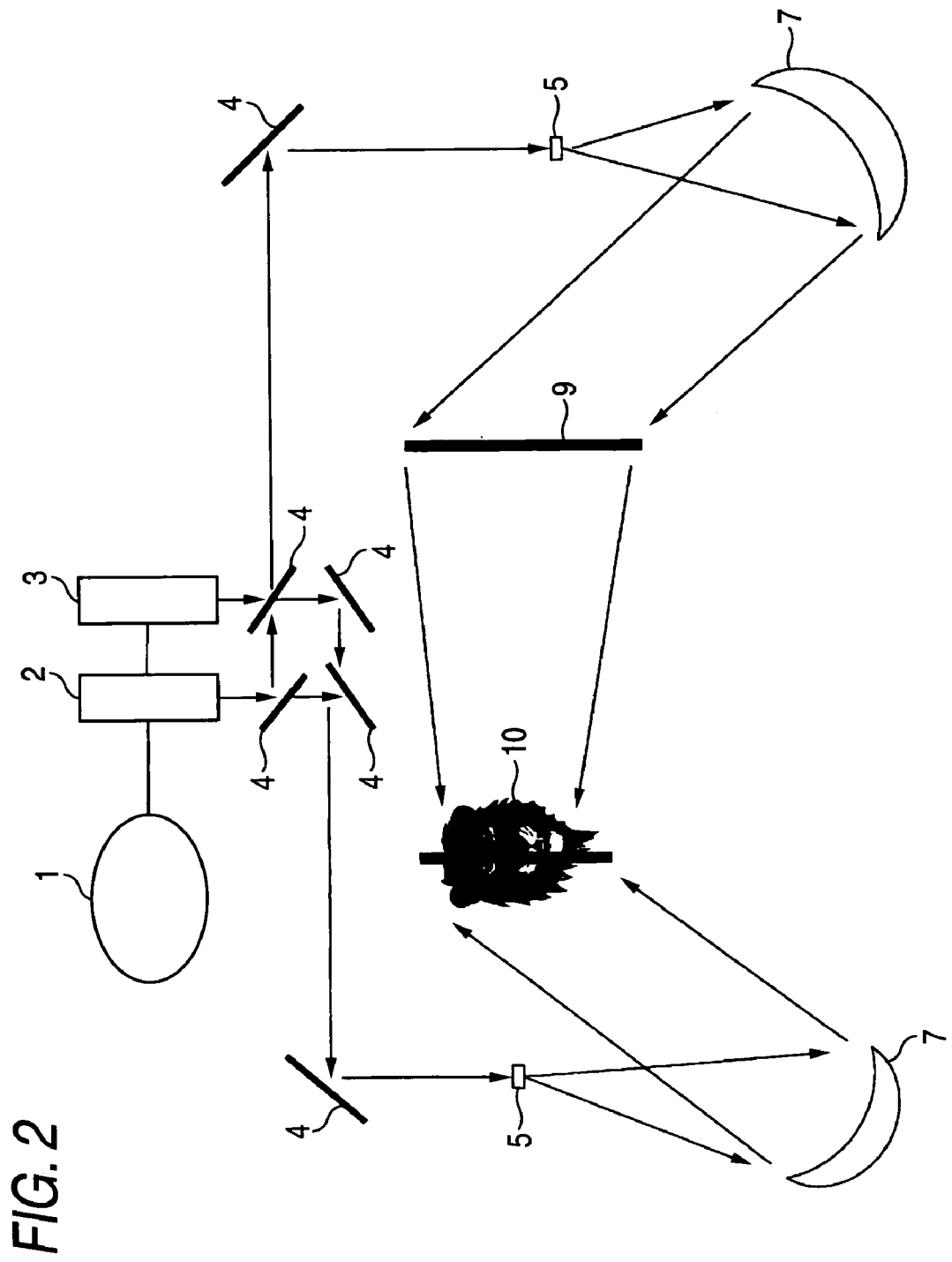
FIG. 2 shows an example of a holography system for recording a reflection hologram according to a non-limiting, illustrative embodiment of the invention.

FIG. 2 shows an example of a system for taking holographic images through recording of reflection holograms according to the invention. By use of combinations (4) including prisms, reflectors and semitransmissive-and-semireflective mirrors, laser light beams from two different lasers (2, 3) are subjected to optical axis alignment, and each beam is split into an object beam and a reference beam. Herein, the arrow-marked solid lines represent beam pathways. The lasers are synchronized with a synchronization circuit (1). The object beams and the reference beams are scaled up through object lenses and spatial filters (5). And it is advantageous that the object beams illuminating the transmission holograms (9) are collimated beams, so a concave lens is used to advantage. The reference beams also are preferably collimated beams, so a concave mirror (7) is used to advantage. As to the reference beams, it is preferable that they illuminate a sensitive material (10) at an incident angle of 45 degrees.

When the reflection holograms are formed from the transmission holograms in the invention, the recording is preferably performed via a reduction optical system. At the time of the reduction, perfect adjustments of depth magnification and lateral magnification are difficult to make, but it is possible to reduce misalignment by devising an optical system as appropriate. The reduced holograms make it possible to provide three-dimensional portraits free from weirdness and capable of giving comfort and satisfaction to customers.

FIG. 3 shows an example of how to view reflection holograms recorded by a holography system according to the invention. Specifically, a customer (12) can enjoy viewing full-color portraits by illuminating the reflection holograms (10) with lighting (11), such as a general halogen lamp or LED. Herein, the arrow-marked solid lines and broken lines represent beam pathways.

The present system is preferably a holography system wherein recordings of transmission holograms are made for customers in many places and recordings of reflection holograms from the transmission holograms are performed with concentration in a few places. For customers who want to have their three-dimensional portraits taken, the recordings of their transmission holograms are made. Every district is dotted with places for those recordings as in the case of traditional photo studios. So, it is possible to take transmission holograms at customers' convenient time and places. These transmission holograms taken are collected into one place or several places. And the transmission holograms thus collected are processed with a concentration for taking of reflection holograms from these transmission holograms. This mode of system is comparable to the conventional system for taking of color negative films and concentrated printing in processing laboratories. By this holography system, wherein recordings of transmission holograms are made for customers in many places and recordings of reflection holograms from the transmission holograms are performed with concentration in a few places, high-quality three-dimensional pictures are consistently made available to customers at low prices. If it is planned to make the recordings of transmission holograms and the recordings of reflection holograms from the transmission holograms in one studio, such a photo studio, there emerges a need for a significant capital investment in installation of equipment including pulsed lasers and quality maintenance becomes a demanding task. Therefore, the execution of only recordings of transmission holograms in a studio like a photo studio can reduce a capital investment and facilitate quality maintenance. Further, if the transmission holograms taken in studios like photo studios are collected into a place like a processing laboratory and processed collectively, and therefrom the reflection holograms are recorded, a capital investment can be reduced similarly and quality maintenance also can be made easy. The reflection holograms thus recorded may be handed directly to customers from the laboratory, or may once be put back to the studio and therefrom handed to the customers.

By making full-color, reduced-size, three-dimensional agreeable portraits available with the system mentioned above, three-dimensional pictures can gain general versatility and become acceptable to the public.

EXAMPLES

The invention will now be illustrated in more detail by reference to the following examples. However, these examples should not be construed as limiting the scope of the invention.

Example 1

Holographic silver halide photosensitive materials according to the invention are described below in detail.

Preparation of Emulsion a1 (for Comparison)

1,660 mL of an aqueous solution containing 0.28 g of KBr and 43.3 g of demineralized ossein gelatin having an average molecular weight of 100,000 was stirred as it was kept at 33° C. To this solution was added 0.04 g of thiourea dioxide, and then the resulting solution was adjusted to pH 6.0. Thereto, 800 mL of an aqueous $AgNO_3$ (96.0 g) solution and an aqueous KBr solution containing 1 mole % of KI were added over a 15-minute period in accordance with a double jet method. During this process, the silver potential was kept at +20 mV with respect to a saturated calomel electrode. After a lapse of two minutes from the start of addition of the aqueous $AgNO_3$ solution in the particle-formation stage, an aqueous $K_3IrCl_6$ solution was added in an amount of $5 \times 10^{-4}$ mole per mole of silver halide. After a supersensitizer I was added in an amount of $3 \times 10^{-4}$ mole per mole of silver halide, sensitizing dyes I and II were added at a mixing ratio of 50:50 by mole in an amount of $9 \times 10^{-4}$ mole per mole of silver halide. Herein, the sensitizing dyes were used in a form of the solid dispersion prepared in accordance with the method disclosed in JP-A-11-52507. More specifically, the solid dispersion of sensitizing dyes was prepared in a process that 0.8 parts by weight of sodium nitrate and 3.2 parts by weight of sodium sulfate were dissolved into 43 parts by weight of ion exchange water, and therein the sensitizing dyes in an amount of 13 parts by weight were admixed and dispersed for 20 minutes at 60° C. by means of dissolver blades rotating at 2,000 rpm.

The emulsion thus obtained was cooled down to 28° C., and washed in a usual way. Thereto, 21 g of demineralized ossein gelatin having a number average molecular weight of 20,000 was added, and then adjusted to pH 6.0 at 40° C. The resulting emulsion was heated up to 60° C., and chemically sensitized to the optimum by adding thereto chloroauric acid ($5.5 \times 10^{-4}$ mole), sodium thiosulfate ($9.9 \times 10^4$ mole) and N,N-dimethylselenourea ($1.7\times10^{-4}$ mole) per mole of silver halide. Thereto, an antifoggant I ($1.0\times10^{-3}$ mole) and an antifoggant II ($3.5\times10^{-3}$ mole) were further added to complete chemical sensitization.

The particles in the thus prepared emulsion a1 were cubic particles with sharp edges, and the number average projected-area diameter thereof was 32 nm and the variation coefficient thereof was 9% with respect to the projected-area diameter. Additionally, these particles are silver bromide particles containing 1 mole % of silver iodide, and the variation coefficient with respect to the distribution of iodide contents among the particles was 7%.

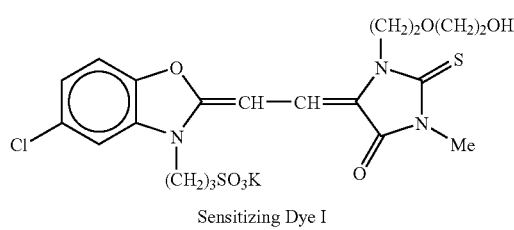

Sensitizing Dye I

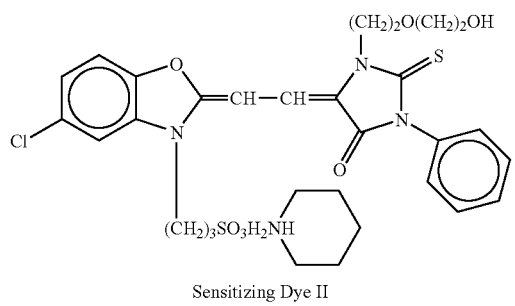

Sensitizing Dye II

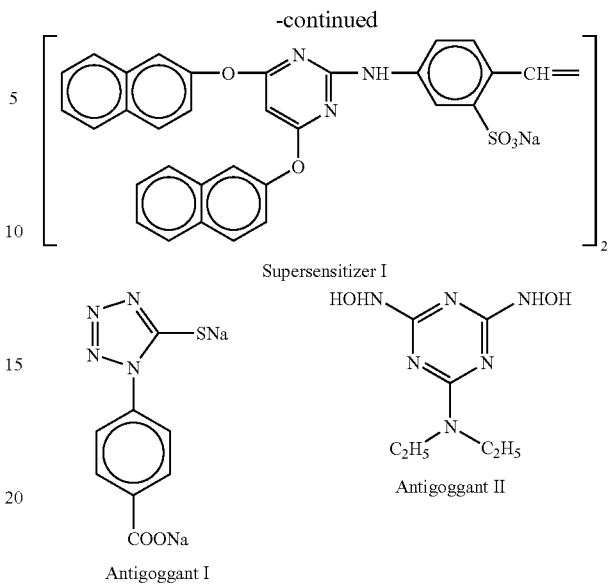

Supersensitizer I

Antigoggant I

Antigoggant II

Preparation of Emulsions b1-1 to b1-3 (According to Invention)

Emulsions b1-1 to b1-3 were prepared in the same manner as Emulsion a1, except that thiourea dioxide was added at 60° C. in amounts of $1\times10^{-5}$ mole, $3\times10^{-5}$ mole and $9\times10^{-5}$ mole, respectively, per mole of silver halide at the moment of 30 minutes before the addition of chloroauric acid during the chemical sensitization. The number average projected-area diameter of the fine particles after chemical sensitization was 32 nm, which was the same as that of the particles in Emulsion a1.

Coating samples were made by coating the emulsions chemically sensitized in the foregoing manners, respectively, on separate undercoat layers provided individually on each 200 μm-thick triacetyl cellulose film under the coating condition as described below in Table-1.

TABLE 1

| Coating Conditions: | |
|---|---|
| [1] | Emulsion (3.00 g/m² on a silver basis) |
| [2] | Gelatin (4.00 g/m²) |
| [3] | Hydroquinone ($1.00 \times 10^{-2}$ mole/mole Ag) |
| [4] | $C_{12}H_{25}$—⟨⟩—$SO_3Na$  ($5 \times 10^{-2}$ g/m²) |
| [5] | $C_9H_{19}$—⟨⟩—$(CH_2CH_2O)_n$—$CH_2$—$SO_3Na$  ($1 \times 10^{-2}$ g/m²)  n = 1~6 |
| [6] | $CH_2$=$CHSO_2CH_2CONH$—$CH_2$<br>$CH_2$=$CHSO_2CH_2CONH$—$CH_2$  (0.2 g/m²) |
| [7] | Other additives |

TABLE 1-continued

Coating Conditions:

[Structures shown: phenyl-OCH₂CH₂OH; triazine with HOHN, NHOH, N(C₂H₅)₂ substituents; methyl-triazolopyrimidine with OH; phenyl-tetrazole-SH with NHCONHCH₃; copolymer of vinylpyrrolidone and vinyl alcohol (x/y = 70/30 by weight, average molecular weight: about 17,000); Pd(II) complex with CH₂CO₂Na groups]

Backing layers were coated on each of the coating samples mentioned above under the following conditions.

Preparation and Application of Coating Composition for Electrically Conductive Layer An aqueous gelatin solution to which the following compounds were added was applied so as to have gelatin coverage of 0.06 g/m².

| | |
|---|---|
| SnO₂/Sb (9/1 by weight, average particle size: 0.25μ) | 186 mg/m² |
| Gelatin (Ca²⁺ content: 3,000 ppm) | 60 mg/m² |
| Sodium p-dodecylbenzenesulfonate | 13 mg/m² |
| Sodium dihexyl-α-sulfosuccinate | 12 mg/m² |
| Sodium polystyrenesulfonate | 10 mg/m² |
| Compound-A | 1 mg/m² |

Preparation and Application of Coating Composition for Backing Layer

An aqueous gelatin solution to which the following compounds were added was applied so as to have gelatin coverage of 1.94 g/m².

| | |
|---|---|
| Gelatin (Ca²⁺ content: 30 ppm) | 1.94 mg/m² |
| Fine particles of polymethyl methacrylate (average particle size: 3.4 μ) | 15 mg/m² |
| Sodium p-dodecylbenzenesulfonate | 7 mg/m² |
| Sodium dihexyl-α-sulfosuccinate | 29 mg/m² |
| Potassium N-perfluorooctanesulfon-yl-N-propylglycine | 5 mg/m² |
| Sodium sulfate | 150 mg/m² |
| Sodium acetate | 40 mg/m² |
| Compound-E (hardener) | 105 mg/m² |
| Compound-C | 15 mg/m² |

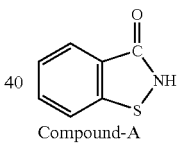

Compound-A

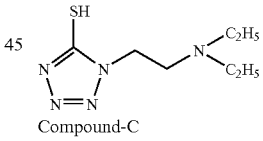

Compound-C

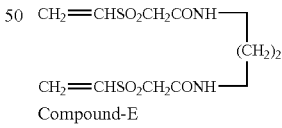

Compound-E

These samples were allowed to stand for 14 hours under a condition that the temperature was 40° C. and the relative humidity was 70%. Thereafter, they were subjected to 10 seconds' exposure via a continuous wedge and a green filter.

The thus exposed samples were each developed with a developer D-19 at 20° C. for 5 minutes, and then subjected to fixation, washing and drying.

The thus processed samples were each examined for sensitivity value at an optical density of fog plus 1.5 and fog value. And the examination results obtained are shown in Table-2.

TABLE 2

| Emulsion | | Concurrent use of gold-chalcogen sensitization with reduction sensitization | Fog | Sensitivity |
|---|---|---|---|---|
| a1 | Comparison | not done | 0.08 | 100 |
| b1-1 | Invention | done | 0.08 | 220 |
| b1-2 | Invention | done | 0.09 | 313 |
| b1-3 | Invention | done | 0.11 | 347 |

As can be seen from the results shown in Table-2, extremely high sensitivity was achieved with the fog hardly increased by the concurrent use of gold-chalcogen sensitization and reduction sensitization during chemical sensitization.

Further, when the coating samples were allowed to stand for 3 months at room temperature and then subjected to exposure and photographic processing in the same manners as mentioned above, it was found that neither change in sensitivity nor change in fog occurred at all. Thus, it is clear that the present photosensitive materials for use in holography have low fog, high sensitivity and excellent storage stability.

Example 2

Emulsions c1-1 to c1-3 were prepared in the same manner as Emulsion b1-2, except that 4-hydroxy-6-methyl-1,3,3a,7-tetrazaindene was further added in amounts of $1\times10^{-3}$ mole, $6\times10^{-3}$ mole and $3.6\times10^{-2}$ mole, respectively, per mole of silver halide before the start of chemical sensitization. Emulsion particle sizes just after preparation and those after three months' storage in a refrigerator were measured. The results obtained are shown in Table-3.

TABLE 3

| Emulsion | Amount of tetrazaindene added (mole/mole AgX) | Particle size just after preparation (nm) | Particle size after 3 months' storage (nm) |
|---|---|---|---|
| b1-2 | 0 | 32 | 38 |
| c1-1 | $1 \times 10^{-3}$ | 32 | 38 |
| c1-2 | $6 \times 10^{-3}$ | 31 | 31 |
| c1-3 | $3.6 \times 10^{-2}$ | 34 | 47 |

As can be seen from the results shown in Table-3, no change in particle size occurred when the tetrazaindene compound was added in the amount of $6\times10^{-3}$ mole per mole of silver halide. On the other hand, addition of the tetrazaindene compound in the amount of $3.6\times10^{-2}$ mole per mole of silver halide caused a greater change in particle size than no addition of the tetrazaindene compound. When these emulsions were each coated, exposed and developed in the same manner as in Example 1, it was found that changes in photographic properties were brought about in response to the change in particle size. In other words, it became clear that the addition of a tetrazaindene compound in an appropriate amount enabled preparation of emulsions stable toward changes with a time lapse from preparation to coating thereof.

Example 3

Effects of the present holographic photosensitive material under the Denisyuk-type hologram taking are shown below.

Preparation of Emulsion d1-1

Emulsion d1-1 was prepared in the same manner as Emulsion c1-2 in Example 2, except that the sensitizing dyes I and II were replaced with sensitizing dyes III and IV, respectively. The number average projected-area diameter of Emulsion d1-1 was found to be 34 nm, and the emulsion particles obtained were particles having rounded cubic shape and a variation coefficient of 11% with respect to the projected-area diameter.

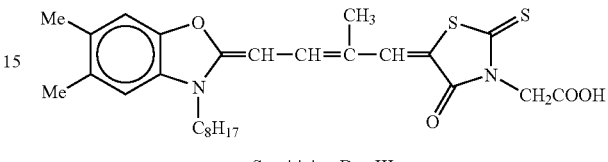

Sensitizing Dye III

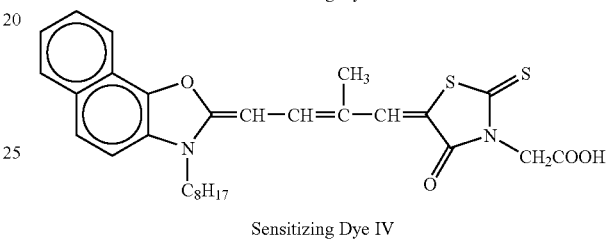

Sensitizing Dye IV

In accordance with the coating conditions shown in Table-1, a 200 μm-thick TAC base was coated with the backing layers on one side, and on the other side thereof. Emulsion d1-1 and Emulsion c1-2 were coated in multilayer form. More specifically, the red-sensitive silver halide emulsion layer and the green-sensitive emulsion layer were coated on the base in a double layer form. Therein, however, the coverage of each sensitive layer was reduced to 0.67 time that shown in Table-1. Two layers considered together, the silver coverage amounted to 4 $g/m^2$ in total and the gelatin coverage amounted to 5.3 $g/m^2$ in total.

By reference to the taking system illustrated in a book entitled *Holography Nyumon, Genri to Jissai*, written by Toshihiro Kubota, published by Asakura Shoten (1995), p. 82, FIG. 5.4, Denisyuk-type hologram taking was carried out using helium-neon laser as a source for red light and argon laser (515 nm) as a source for green light. And the photographic processing was performed according to the formula described at page 159 in the book cited above, specifically using a developer CW-C2 and a bleaching solution PBQ-2. According to visual observation, the images reproduced were rated as bright-and-clear color images. In this experiment, though exposure to blue light was not carried out, it was clarified that reproduced color images of good quality were obtained even by the use of two color varieties of light, red light and green light. And it is anticipated that exceedingly clear color images can be reproduced by addition of exposure to blue light.

Simple reproduction apparatus was built using red and green LEDs corresponding to the wavelengths of reproduction waves. This apparatus allowed simple reproduction of the hologram measuring 10 cm×12 cm in size on a table by means of a 1.5 V dry battery, and it was designed to illuminate the hologram from a distance of 15 cm at an angle of 45 degrees from the above, which was the same as the angle of the reference light. The use of the present photosensitive material made it possible to enjoy viewing of good-quality reproduced images with such a simple apparatus installed in a lighted room.

Example 4

Preparation of Emulsion a2 (for Comparison)

1,659 mL of an aqueous solution containing 0.28 g of KBr and 33.3 g of phthaloylated-and-demineralized ossein gelatin having an average molecular weight of 100,000 was stirred as it was kept at 34° C. To this solution was added an aqueous solution containing 0.04 g of thiourea dioxide, and then the resulting solution was adjusted to pH 6.0. Thereto, 800 mL of an aqueous $AgNO_3$ (96.0 g) solution and an aqueous KBr solution containing 1 mole % of KI were added over a 15-minute period in accordance with a double jet method. During this process, the silver potential was kept at +20 mV with respect to a saturated calomel electrode. After the supersensitizer I was added in an amount of $6.7 \times 10^{-4}$ mole per mole of silver halide, the sensitizing dye IV was added in an amount of $6.1 \times 10^{-4}$ mole per mole of silver halide. Thereafter, a sensitizing dye V was added in an amount of $5.2 \times 10^{-4}$ mole per mole of silver halide. Herein, the sensitizing dyes were used in a form of the solid dispersion prepared in accordance with the method disclosed in JP-A-11-52507. More specifically, the solid dispersion of sensitizing dye was prepared in a process that 0.8 parts by weight of sodium nitrate and 3.2 parts by weight of sodium sulfate were dissolved into 43 parts by weight of ion exchange water, and therein the sensitizing dye in an amount of 13 parts by weight were admixed and dispersed for 20 minutes at 60° C. by means of dissolver blades rotating at 2,000 rpm.

The emulsion thus obtained was cooled down to 32° C., and washed (desalted) in a usual way. Thereto, 21 g of oxidation-treated, demineralized ossein gelatin having a number average molecular weight of 20,000 was added, and then adjusted to pH 8.0 at 45° C. The resulting emulsion was heated up to 60° C., and chemically sensitized to the optimum by adding sequentially thereto $8.0 \times 10^{-5}$ mole of thiourea dioxide, $4.5 \times 10^{-3}$ mole of the antifoggant I, $4.1 \times 10^{-4}$ mole of chloroauric acid and $1.2 \times 10^{-3}$ mole of sodium thiosulfate per mole of silver halide. Then, the antifoggant II ($2.5 \times 10-4$ mole) was further added to complete chemical sensitization.

The particles in the thus prepared emulsion a2 were cubic particles having a number average projected-area diameter of 38 nm and a variation coefficient of 7% with respect to the projected-area diameter. These particles were silver bromide particles having an iodide content of 1 mole %.

Preparation of Emulsion b2 (for Comparison)

Emulsion b2 was prepared in the same manner as Emulsion a2, except that the amounts of the sensitizing dyes IV and II added was increased by a factor of 1.3. The number average projected diameter of the fine particles after the chemical sensitization was 38 nm and the same as that of Emulsion a2.

Preparation of Emulsion c2 (According to Invention)

Emulsion c2 was prepared in the same manner as Emulsion a2, except that a sensitizing dye V was further added in an amount of $4.3 \times 10^{-4}$ mole per mole of silver halide before the addition of the sensitizing dye IV. The number average projected diameter of the fine particles after the chemical sensitization was 38 nm and the same as that of Emulsion a2.

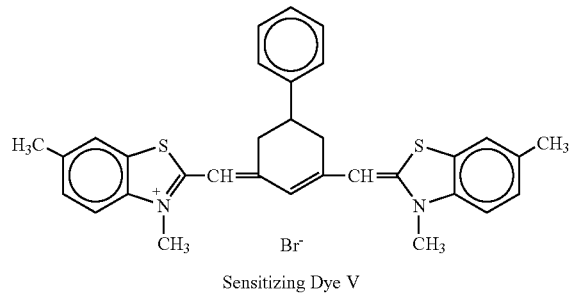

Sensitizing Dye V

Preparation of Emulsion d2 (According to Invention)

Emulsion d2 was prepared in the same manner as Emulsion a2, except that the amount of the sensitizing dye IV was reduced to $3.7 \times 10^{-4}$ mole per mole of silver halide and the sensitizing dye III was additionally added in an amount of $3.0 \times 10^{-4}$ mole per mole of silver halide. The number average projected diameter of the fine particles after the chemical sensitization was 38 nm and the same as that of Emulsion a2.

The emulsions chemically sensitized in the foregoing manners were each coated on the undercoat-provided side of 200 μm-thick triacetyl cellulose film support and backing layers mentioned below were coated on the other side of the support under the coating conditions as described below in Table-4, thereby preparing coating samples.

TABLE 4

Coating Conditions:

[1] Emulsion (4.00 g/m² on a silver basis)

[2] Gelatin (5.4 g/m²)

[3] Hydroquinone ($1.00 \times 10^{-2}$ mole/mole Ag)

[4] 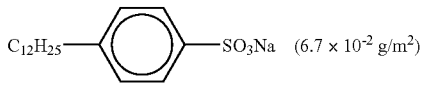

TABLE 4-continued

Coating Conditions:

[5]

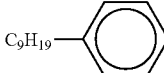

C₉H₁₉—〔benzene〕—(CH₂CH₂O)ₙ—CH₂—SO₃Na  (1.3 × 10⁻² g/m²)

n = 1~6

[6]  CH₂=CHSO₂CH₂CONH—CH₂
     |                              (0.3 g/m²)
     CH₂=CHSO₂CH₂CONH—CH₂

[7] Other additives

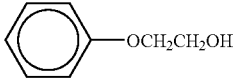

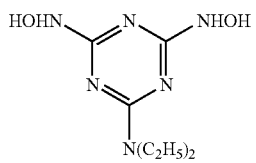

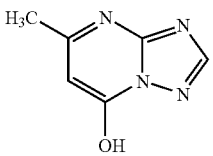

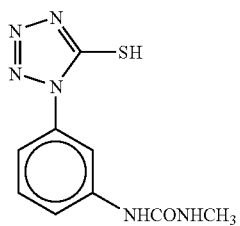

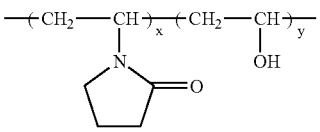

Backing layers were coated on each of the coating samples mentioned above under the following conditions.

Preparation and Application of Coating Composition for Electrically Conductive Layer An aqueous gelatin solution to which the following compounds were added was applied so as to have gelatin coverage of 0.06 g/m².

| | |
|---|---|
| SnO₂/Sb (9/1 by weight, average particle size: 0.25μ) | 86 mg/m² |
| Gelatin (Ca²⁺ content: 3,000 ppm) | 60 mg/m² |
| Sodium p-dodecylbenzenesulfonate | 13 mg/m² |
| Sodium dihexyl-α-sulfosuccinate | 12 mg/m² |
| Sodium polystyrenesulfonate | 10 mg/m² |
| Compound-A | 1 mg/m² |

Preparation and Application of Coating Composition for Backing Layer

An aqueous gelatin solution to which the following compounds were added was applied so as to have gelatin coverage of 1.94 g/m².

| | |
|---|---|
| Gelatin (Ca²⁺ content: 30 ppm) | 1.94 mg/m² |
| Fine particles of polymethyl methacrylate (average particle size: 3.4μ) | 15 mg/m² |
| Sodium p-dodecylbenzenesulfonate | 7 mg/m² |
| Sodium dihexyl-α-sulfosuccinate | 29 mg/m² |
| Potassium N-perfluorooctanesulfonyl-N-propylglycine | 5 mg/m² |
| Sodium sulfate | 150 mg/m² |
| Sodium acetate | 40 mg/m² |
| Compound-E (hardener) | 105 mg/m² |
| Compound-C | 15 mg/m² |

The wavelength and the transmission absorbance corresponding to the spectral absorption maximum that each of the coating samples had in the range of 500 nm to 550 nm and those corresponding to the spectral absorption maximum that each of the coating samples had in the range of 600 nm to less than 700 nm are shown in Table-5.

TABLE 5

| Emulsion | Variety of Sensitizing Dyes used | note | Absorption Maximum in 500 nm-to-550 nm range | | Absorption Maximum in 600 nm-to-700 nm range | |
|---|---|---|---|---|---|---|
| | | | Wavelength | Transmission Absorbance | Wavelength | Transmission Absorbance |
| a2 | two varieties | comparison | 528 nm | 0.28 | 654 nm | 0.28 |
| b2 | two varieties | comparison | 529 nm | 0.33 | 654 nm | 0.34 |
| c2 | three varieties | invention | 528 nm | 0.28 | 664 nm | 0.35 |
| d2 | four varieties | invension | 528 nm | 0.28 | 662 nm | 0.31 |

These samples were allowed to stand for 14 hours under a condition that the temperature was 40° C. and the relative humidity was 70%. Thereafter, they were subjected to 10 seconds' exposure via a continuous wedge and interference filters. The interference filters used therein were a 689-nm filter, a 629-nm filter, a 530-nm filter and a 490-nm filter in responsive to ruby laser light with a wavelength of 694 nm, helium-neon laser light with a wavelength of 633 nm, YAG laser light with a wavelength of 532 nm and argon laser light with a wavelength of 488 nm, respectively.

The thus exposed samples were each developed with a developer D-19 at 20° C. for 5 minutes, and then fixed, washed and dried in succession.

The thus processed samples were each examined for sensitivity value at an optical density of fog plus 1.5 and fog value. And the examination results obtained are shown in Table-6.

This effect was more predominant in the case of Emulsion d2 using four varieties of sensitizing dyes.

Emulsions c2 and d2 according to the invention enabled a sheet of photosensitive material to achieve at one time high sensitivities to all lasers, including ruby laser, krypton laser, helium-neon laser, YAG laser and argon laser. As a result, formation of holograms including monochromatic and polychromatic ones became feasible and the holograms formed can be used for general purposes.

Example 5

In the photosensitive material using the present Emulsion d2 prepared in Example 4, a measure of Dye II was added

TABLE 6

| Emulsion | Variety of Sensitizing Dyes used | note | Fog | Sensitivity | | | |
|---|---|---|---|---|---|---|---|
| | | | | 689 nm | 629 nm | 530 nm | 490 nm |
| a2 | two varieties | comparison | 0.16 | 100 | 100 | 100 | 100 |
| b2 | two varieties | comparison | 0.15 | 87 | 87 | 83 | 78 |
| c2 | three varieties | invention | 0.15 | 631 | 173 | 135 | 132 |
| d2 | four varieties | invention | 0.14 | 636 | 190 | 138 | 135 |

As can be seen from the results shown in Table-6, high sensitivity was attained at every laser wavelength by using at least three varieties of spectral sensitizing dyes. In Emulsion b2, the two varieties of sensitizing dyes were increased in amount added, compared with those in Emulsion a2. Contrary to expectations, the sensitivity was decreased at every wavelength. On the other hand, the use of at least three varieties of sensitizing dyes effected increases in sensitivity over the full range of wavelengths though the dyes used was increased in amount with respect to those in Emulsion a2.

to the emulsion. More specifically, the amount of Dye II added was adjusted so that the photosensitive material had transmission absorbance of 0.3, 0.8 or 1.5. Each of the photosensitive materials prepared was exposed and processed in the same manners as in Example 4. Further, each photosensitive material was subjected to 10 seconds' exposure via an additional 590-nm interference filter without using a continuous wedge, processed, and then examined for fog value. And safelight immunity was evaluated from the fog value examined. The results obtained are shown in Table-7.

TABLE 7

| Emulsion | Dye | Transmission Absorbance at 586 nm | Fog | Sensitivity | | | | Fog by 590-nm Exposure |
|---|---|---|---|---|---|---|---|---|
| | | | | 689 nm | 629 nm | 530 nm | 490 nm | |
| d2 | not used | — | 0.14 | 639 | 190 | 138 | 135 | 0.38 |
| d2 | used | 0.3 | 0.14 | 636 | 190 | 138 | 135 | 0.32 |
| d2 | used | 0.8 | 0.14 | 636 | 184 | 135 | 135 | 0.20 |
| d2 | used | 1.5 | 0.14 | 636 | 172 | 120 | 135 | 0.16 |

As can be seen from Table-7, incorporation of the dye having its spectral absorption maximum in the range of 550 nm to 600 nm enabled the use of 590-nm safelight without attended by a problem of lowering sensitivities to typical lasers. In other words, high-speed panchromatic photosensitive materials for use in holography, which do not require to be handled in the total darkness, can be made available.

Example 6

Effects of the present holographic photosensitive material under the Denisyuk-type hologram taking are shown below.

Evaluation was made using the sample whose transmission absorbance was adjusted to 0.8 by addition of the dye in Example 5. Operations for hologram taking were made under an orange light. The lighting was in a situation enough for visible observation. Denisyuk-type hologram taking was carried out using helium-neon laser as a source for red light and argon laser (515 nm) as a source for green light by reference to the taking system illustrated in a book entitled *Holography Nyumon, Genri to Jissai*, written by Toshihiro Kubota, published by Asakura Shoten (1995), p. 82, FIG. 5.4. And the photographic processing was performed according to the formula described at page 159 in the book cited above, specifically using a developer CW-C2 and a bleaching solution PBQ-2. According to visual observation, the images reproduced were rated as bright-and-clear color images. In this experiment, though exposure to blue light was not carried out, it was clarified that reproduced color images of good quality were obtained even by the use of two color varieties of light, red light and green light. And it is anticipated that extremely clear color images can be reproduced by addition of exposure to blue light.

Simple reproduction apparatus was built using red and green LEDs corresponding to the wavelengths of reproduction waves. This apparatus allowed simple reproduction of the hologram measuring 10 cm×12 cm in size on a table by means of a 1.5 V dry battery, and it was designed to illuminate the hologram from a distance of 15 cm at an angle of 45 degrees from the above, which was the same as the angle of the reference light. The use of the present photosensitive material made it possible to enjoy viewing of good-quality reproduced images with such a simple apparatus installed in a lighted room.

Example 7

Preparation of Emulsion a3

1,659 mL of an aqueous solution containing 0.28 g of KBr and 33.3 g of phthaloylated-and-demineralized ossein gelatin having an average molecular weight of 140,000 was stirred as it was kept at 34° C. To this solution was added an aqueous solution containing 0.04 g of thiourea dioxide, and then the resulting solution was adjusted to pH 6.0. Thereto, 800 mL of an aqueous $AgNO_3$ (96.0 g) solution and an aqueous KBr solution containing 1 mole % of KI were added over a 15-minute period in accordance with a double jet method. During this process, the silver potential was kept at +20 mV with respect to a saturated calomel electrode. After the supersensitizer I was added in an amount of $6.7\times10^{-4}$ mole per mole of silver halide, the sensitizing dye V was added in an amount of $4.3\times10^{-4}$ mole per mole of silver halide. Thereafter, the sensitizing dye IV was added in an amount of $6.1\times10^{-4}$ mole per mole of silver halide. Then, the sensitizing dye II was further added in an amount of $5.2\times10^{-4}$ mole per mole of silver halide. Herein, the sensitizing dyes were used in a form of the solid dispersion prepared in accordance with the method disclosed in JP-A-11-52507. More specifically, the solid dispersion of sensitizing dye was prepared in a process that 0.8 parts by weight of sodium nitrate and 3.2 parts by weight of sodium sulfate were dissolved into 43 parts by weight of ion exchange water, and therein the sensitizing dye in an amount of 13 parts by weight were admixed and dispersed for 20 minutes at 60° C. by means of dissolver blades rotating at 2,000 rpm.

The emulsion thus obtained was cooled down to 32° C., and washed in a usual way. Thereto, 21 g of oxidation-treated, demineralized ossein gelatin having a number average molecular weight of 20,000 was added, and then adjusted to pH 6.0 at 45° C. The resulting emulsion was heated up to 60° C., and chemically sensitized to the optimum by adding sequentially thereto thiourea dioxide ($3.5\times10^{-5}$ mole), Radical Scavenger A-3 ($9.1\times10^{-3}$ mole), chloroauric acid ($1.84\times10^4$ mole) and sodium thiosulfate ($7.0\times10^{-4}$ mole) per mole of silver halide. Then, the antifoggant I ($2.5\times10^{-4}$ mole) was further added to complete chemical sensitization.

The particles in the thus prepared emulsion a3 were cubic particles having a number average projected-area diameter of 38 nm and a variation coefficient of 7% with respect to the projected-area diameter. These emulsion particles were silver bromide particles having an iodide content of 1 mole %.

Preparation of Emulsion b3

Emulsion b3 was prepared in the same manner as Emulsion a3, except that the oxidation-treated demineralized ossein gelatin having a weight average molecular weight of 20,000 was replaced by oxidation-treated ossein gelatin having a weight average molecular weight of 140,000. The number average projected-area diameter of the fine particles after the chemical sensitization was 38 nm, which was the same as that of Emulsion a3.

The emulsions chemically sensitized in the foregoing manners were coated on the undercoat-provided side of 200 μm-thick triacetyl cellulose film support and backing layers mentioned below were coated on the other side of the support under the coating conditions as described below in Table-8. Therein, changes were made to the proportion of low molecular-weight gelatin in the silver halide emulsion layer by changing the ratio between the emulsion a3 and the emulsion b3 and the types of gelatin added at the time of coating and the ratio between them, thereby preparing four varieties of samples. The gelatin species added at the time of coating were non-demineralized ossein gelatin having a weight average molecular weight of 140,000 and demineralized ossein gelatin having a weight average molecular weight of 20,000.

Coating Conditions:

[1] Emulsion (4.00 g/m2 on a silver basis)
[2] Gelatin (5.4 g/m²)
[3] Hydroquinone (1.00 × 10⁻² mole/mole Ag)

[4]
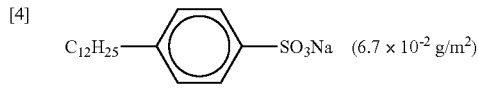

[5]
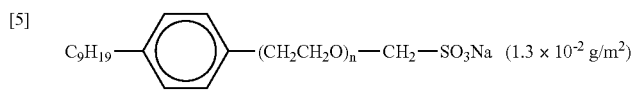

n = 1~6

[6]
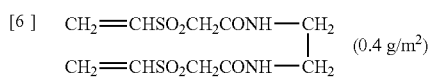

[7] Other additives

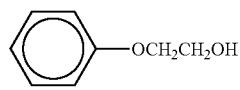

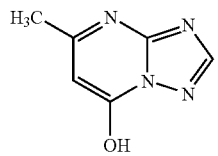

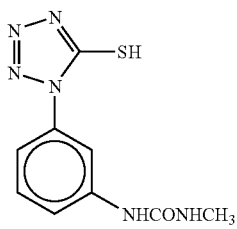

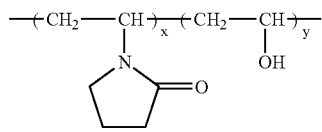

x/y = 70/30 (by weight)
average molecular weight: about 17,000

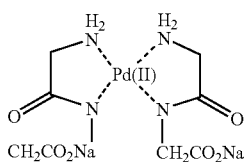

Backing layers were coated on each of the coating samples mentioned above under the following conditions.

Preparation and Application of Coating Composition for Electrically Conductive Layer An aqueous gelatin solution to which the following compounds were added was applied so as to have gelatin coverage of 0.06 g/m².

| | |
|---|---|
| SnO₂/Sb (9/1 by weight, average particle size: 0.25μ) | 186 mg/m² |
| Gelatin (Ca²⁺ content: 3,000 ppm) | 60 mg/m² |
| Sodium p-dodecylbenzenesulfonate | 13 mg/m² |
| Sodium dihexyl-α-sulfosuccinate | 12 mg/m² |
| Sodium polystyrenesulfonate | 10 mg/m² |
| Compound-A | 1 mg/m² |

Preparation and Application of Coating Composition for Backing Layer

An aqueous gelatin solution to which the following compounds were added was applied so as to have gelatin coverage of 3.97 g/m².

| | |
|---|---|
| Gelatin (Ca²⁺ content: 30 ppm) | 3.97 mg/m² |
| Fine particles of polymethyl methacrylate (average particle size: 3.4μ) | 25 mg/m² |
| Sodium p-dodecylbenzenesulfonate | 16 mg/m² |
| Sodium dihexyl-α-sulfosuccinate | 65 mg/m² |
| Potassium N-perfluorooctanesulfonyl-N-propylglycine | 11 mg/m² |
| Sodium sulfate | 338 mg/m² |
| Sodium acetate | 90 mg/m² |
| Compound-E (hardener) | 236 mg/m² |
| Compound-C | 34 mg/m² |

The proportions between the low molecular-weight gelatin having a weight average molecular weight of 20,000 and the gelatin having a weight average molecular weight of 140,000 in the samples prepared are shown in Table-9. The samples were almost equal in terms of hardening degree, and the thickness of each sample after swelling in water was 1.9 times the thickness before processing.

TABLE 9

| Sample No. | note | Proportion of Low Molecular-weight Gelatin in Silver Halide Emulsion Layer |
|---|---|---|
| 101 | comparison | 0 |
| 102 | invention | 5 |
| 103 | invention | 20 |
| 104 | invention | 60 |

Each of these samples was subjected to reflex interference exposure by means of He—Ne laser. The optical system used therein was designed so that the light from the laser was split into two light beams, and one light beam illuminated each sample vertically, and simultaneously the other light beam illuminated each sample at an angle of 45 degrees from the opposite side. Thereafter, each of the thus exposed samples was with a developer D-19 for 5 minutes at 20° C., and processed for 5 minutes at 20° C. by use of a bleaching solution having the following composition.

Thereafter, washing was carried out at 30° C. Herein, the washing time was chosen from three different spans, 5 minutes, 30 minutes and 60 minutes.

Composition of Bleaching Solution:

| Disodium ethylenediaminetetraacetate | 30 g |
|---|---|
| Ferric sulfate | 30 g |
| Sodium hydrogen sulfate | 30 g |
| KBr | 30 g |
| Water to make | 1 L |

After each sample was dried, transmittance thereof was measured with a general spectrophotometer. The reproduction wavelengths determined from evaluation of the transmittance are shown in Table-10.

TABLE 10

| Sample No. | note | Reproduction Wavelength | | |
|---|---|---|---|---|
| | | Washing time: 5 min. | Washing time: 30 min. | Washing time: 60 min. |
| 101 | comparison | 621 nm | 620 nm | 617 nm |
| 102 | invention | 619 nm | 612 nm | 608 nm |
| 103 | invention | 612 nm | 602 nm | 594 nm |
| 104 | invention | 582 nm | 541 nm | 502 nm |

As can be seen from Table-10, the photosensitive materials according to the invention made it possible to arbitrarily control the reproduction wavelength by changing the washing time. The blue shift of the reproduction wavelength was gentle when the proportion of the low molecular-weight gelatin was low, while it is steep when the proportion of low molecular-weight gelatin was high. When it is intended that the reproduction wavelength is made equivalent to the recording wavelength, the intention can easily be accomplished by reducing the washing time or lowering the washing temperature. In other words, the invention enabled arbitrary control of spaces between interference fringes.

Example 8

Photosensitive materials 201 and 202 were produced in the same manner as the present photosensitive material No. 103 produced in Example 7, except that their respective backing layers were changed in gelatin coverage. Evaluations of curling resistance under a condition of 25° C.-10% RH were performed on unprocessed and processed samples of each photosensitive material, wherein the expression "processed samples" refers to the situations in which each photosensitive material has undergone the same exposure and processing operations as in Example 7. Film samples kept level were rated as good, and those curved or curled were rated relatively as poor. The results obtained are shown in Table-11.

TABLE 11

| Sample No. | Gelatin Coverage of Backing Layer | Curling Resistance | | |
|---|---|---|---|---|
| | | Unprocessed Sample | Processed Sample, Washing Time: 5 min. | Processed Sample, Washing Time: 60 min. |
| 103 | 4.95 g/m$^2$ | good | good | good |
| 201 | 2.16 g/m$^2$ | poor | poor | poor |
| 202 | 6.48 g/m$^2$ | good | good | poor |

As can be seen from Table-11, the present photosensitive material containing low molecular-weight gelatin in the silver halide emulsion layer can have good curling resistance by controlling the gelatin coverage of the backing layer in not only an unprocessed state but also a processed state in which the processing time is variable, so it can have excellent handling suitability. In other words, the film sample is consistently kept level, so it has excellent interference-pattern recording characteristics and reproduction characteristics.

Example 9

Samples 301, 302, 303, 304 and 305 were produced in the same manner as Sample 103 produced in Example 7, except that the Emulsion a3 used was replaced with their respective emulsions. Specifically, the emulsion used in Sample 301 was the emulsion prepared by removing the radical scavenger from Emulsion a3. The emulsion used in Sample 302 was an emulsion prepared from Emulsion a3 by replacing the radical scavenger therein with Radical Scavenger A-38. The emulsion used in Sample 303 was an emulsion prepared from Emulsion a3 by replacing the radical scavenger therein with Radical Scavenger A-6. The emulsion used in Sample 304 was an emulsion prepared from Emulsion a3 by replacing the radical scavenger therein with Radical Scavenger A-27. The emulsion used in Sample 305 was an emulsion prepared from Emulsion a3 by replacing the radical scavenger therein with Radical Scavenger A-8.

Each of these samples was cut into pieces 3.5 by 3.5 cm square. Six among these pieces were stacked in layers so that the emulsion surface of each piece was brought into contact with the backing layer surface of another piece, and thereon a load of 350 g was imposed for 3 days under a condition of 25° C.-30% RH. The third piece from the top was developed with D-19 at 20° C. for 5 minutes, and then subjected to fixation. And pressure fog resulting from the matting agent on the backing layer surface was evaluated relatively on each of the thus treated samples. Specifically, samples having no blacked point image ware rated as excellent, those having a few blacked point images were rated as good, those having many blacked point images were rated as so-so, and those having a great many blacked point images were rated as poor.

TABLE 12

| Sample No. | Radical Scavenger used | Pressure Fog condition |
|---|---|---|
| 103 | A-3 | good |
| 301 | nothing | poor |
| 302 | A-38 | excellent |
| 303 | A-6 | excellent |
| 304 | A-27 | so-so |
| 305 | A-8 | so-so |

As can be seen from the results shown in Table-12, the use of radical scavengers made it possible to noticeably suppress pressure fog caused by the matting agent when a sheet of the photosensitive material using low molecular-weight gelatin in the silver halide emulsion layer was stuck to another sheet. When no matting agent was used, adhesion of one sheet of the photosensitive material to another sheet thereof under high humidity became a problem, the emulsion layer came off in the extreme case.

Example 10

Effects of the present holographic photosensitive material under the Denisyuk-type hologram taking are shown below. Evaluations were made using Sample 103 produced in Example 7. Denisyuk-type hologram taking was carried out using helium-neon laser (632.8 nm) as a source for red light, Nd:YAG laser (532 nm) and argon laser (488 nm) as a source for blue light by reference to the taking system illustrated in a book entitled *Holography Nyumon, Genri to Jissai*, written by Toshihiro Kubota, published by Asakura Shoten (1995), p. 82, FIG. 5.4. And the photographic processing was performed according to the formula described at page 159 in the book cited above, specifically using a developer CW-C2 and a bleaching solution PBQ-2. According to visual observation, the images reproduced were rated as bright-and-clear color images.

Simple reproduction apparatus was built using a white LED. This apparatus allowed simple reproduction of the hologram measuring 10 cm×12 cm in size on a table by means of a 1.5 V dry battery, and it was designed to illuminate the hologram from a distance of 15 cm at an angle of 45 degrees from the above, which was the same as the angle of the reference light. The use of the present photosensitive material made it possible to enjoy viewing of good-quality reproduced images with such a simple apparatus installed in a lighted room.

Example 12

Production of Silver Halide Photosensitive Material 1,659 mL of an aqueous solution containing 0.28 g of KBr and 33.3 g of phthaloylated-and-demineralized ossein gelatin having an average molecular weight of 100,000 was stirred as it was kept at 34° C. To this solution was added an aqueous solution containing 0.04 g of thiourea dioxide, and then the resulting solution was adjusted to pH 6.0. Thereto, 800 mL of an aqueous $AgNO_3$ (96.0 g) solution and an aqueous KBr solution containing 1 mole % of KI were added over a 15-minute period in accordance with a double jet method. During this process, the silver potential was kept at +20 mV with respect to a saturated calomel electrode. After the supersensitizer I was added in an amount of $6.7 \times 10^{-4}$ mole per mole of silver halide, the sensitizing dye IV was added in an amount of $6.1 \times 10^{-4}$ mole per mole of silver halide. Thereafter, the sensitizing dye V was added in an amount of $5.2 \times 10^{-4}$ mole per mole of silver halide. Further, the sensitizing dye II was added in an amount of $5.2 \times 10^{-4}$ mole per mole of silver halide. Herein, the sensitizing dyes were used in a form of the solid dispersion prepared in accordance with the method disclosed in JP-A-11-52507. More specifically, the solid dispersion of sensitizing dye was prepared in a process that 0.8 parts by weight of sodium nitrate and 3.2 parts by weight of sodium sulfate were dissolved into 43 parts by weight of ion exchange water, and therein the sensitizing dye in an amount of 13 parts by weight were admixed and dispersed for 20 minutes at 60° C. by means of dissolver blades rotating at 2,000 rpm.

The emulsion thus obtained was cooled down to 32° C., and washed in a usual way. Thereto, 21 g of oxidation-treated, demineralized ossein gelatin having a number average molecular weight of 20,000 was added, and then adjusted to pH 8.0 at 45° C. The resulting emulsion was heated up to 60° C., and chemically sensitized to the optimum by adding sequentially thereto $8.0 \times 10^{-5}$ mole of thiourea dioxide, $4.5 \times 10^{-3}$ mole of the antifoggant I, $4.1 \times 10^{-4}$ mole of chloroauric acid and $1.2 \times 10^{-3}$ mole of sodium thiosulfate per mole of silver halide. Then, the antifoggant II ($2.5 \times 10^{-4}$ mole) was further added to complete chemical sensitization.

The particles in the thus prepared emulsion were cubic particles having a number average projected-area diameter of 38 nm and a variation coefficient of 7% with respect to the projected-area diameter. These particles were silver bromide particles having an iodide content of 1 mole %.

The emulsions chemically sensitized in the foregoing manners were each coated on the undercoat-provided side of 200 μm-thick triacetyl cellulose film support and backing layers mentioned below were coated on the other side of the support under the coating conditions as described below in Table-12, thereby preparing a coating sample.

TABLE 12

Coating Conditions:

[1] Emulsion (4.00 g/m² on a silver basis)

[2] Gelatin (5.4 g/m²)

[3] Hydroquinone (1.00 × 10⁻² mole/mole Ag)

[4] $C_{12}H_{25}$—⟨phenyl⟩—$SO_3Na$  (6.7 × 10⁻² g/m²)

TABLE 12-continued

Coating Conditions:

[5] 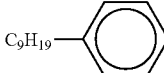 $C_9H_{19}$—〇—$(CH_2CH_2O)_n$—$CH_2$—$SO_3Na$ ($1.3 \times 10^{-2}$ g/m$^2$)

n = 1~6

[6] 
$CH_2$=$CHSO_2CH_2CONH$—$CH_2$
$\qquad\qquad\qquad\qquad\qquad\quad |$
$CH_2$=$CHSO_2CH_2CONH$—$CH_2$    (0.3 g/m$^2$)

[7] Other additives

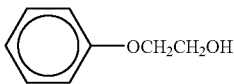
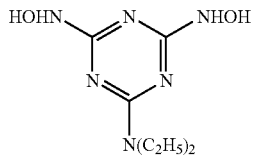
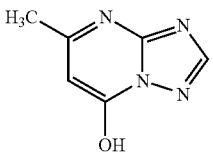
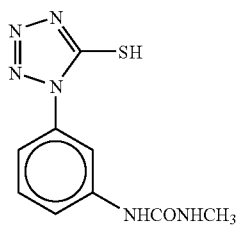
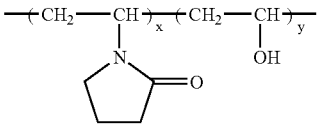

x/y = 70/30 (by weight)
average molecular weight: about 17,000

Backing layers were coated on the coating sample mentioned above under the following conditions.

Preparation and Application of Coating Composition for Electrically Conductive Layer An aqueous gelatin solution to which the following compounds were added was applied so as to have gelatin coverage of 0.06 g/m$^2$.

| | |
|---|---|
| SnO$_2$/Sb (9/1 by weight, average particle size: 0.25μ) | 186 mg/m$^2$ |
| Gelatin (Ca$^{2+}$ content: 3,000 ppm) | 60 mg/m$^2$ |
| Sodium p-dodecylbenzenesulfonate | 13 mg/m$^2$ |
| Sodium dihexyl-α-sulfosuccinate | 12 mg/m$^2$ |
| Sodium polystyrenesulfonate | 10 mg/m$^2$ |
| Compound-A | 1 mg/m$^2$ |

Preparation and Application of Coating Composition for Backing Layer

An aqueous gelatin solution to which the following compounds were added was applied so as to have gelatin coverage of 1.94 g/m$^2$.

| | |
|---|---|
| Gelatin (Ca$^{2+}$ content: 30 ppm) | 1.94 mg/m$^2$ |
| Fine particles of polymethyl methacrylate (average particle size: 3.4μ) | 15 mg/m$^2$ |
| Sodium p-dodecylbenzenesulfonate | 7 mg/m$^2$ |
| Sodium dihexyl-α-sulfosuccinate | 29 mg/m$^2$ |
| Potassium N-perfluorooctanesulfonyl-N-propylglycine | 5 mg/m$^2$ |
| Sodium sulfate | 150 mg/m$^2$ |
| Sodium acetate | 40 mg/m$^2$ |
| Compound-E (hardener) | 105 mg/m$^2$ |
| Compound-C | 15 mg/m$^2$ |

Recording:

The holographic photosensitive material prepared in the foregoing manner was used under the conditions for hologram-taking of Denisyuk type. The Denisyuk-type hologram taking was carried out using helium-neon laser as a source for red light and YAG laser as a source for green light by reference to the taking system illustrated in a book entitled *Holography Nyumon, Genri to Jissai*, written by Toshihiro Kubota, published by Asakura Shoten (1995), p. 82, FIG. 5.4. And the photographic processing was performed according to the formula described at page 159 in the book cited above, specifically using a developer CW-C2 and a bleaching solution PBQ-2. According to visual observation, the images reproduced were rated as bright-and-clear color images. In this experiment, though exposure to blue light was not carried out, it was clarified that reproduced color images of good quality were obtained even by the use of two color varieties of light, red light and green light. Herein, the exposure amount of helium-neon laser was 50 µJ/m², and that of YAG laser was also 50 µJ/m².

Simple reproduction apparatus was built using red and green LEDs corresponding to the wavelengths of reproduction waves. This apparatus allowed simple reproduction of the hologram measuring 10 cm×12 cm in size on a table by means of a 1.5 V dry battery, and it was designed to illuminate the hologram from a distance of 15 cm at an angle of 45 degrees from the above, which was the same as the angle of the reference light. The use of the present photosensitive material made it possible to enjoy viewing of good-quality reproduced images with such a simple apparatus installed in a lighted room.

The experimental results mentioned above show that even a picture taken with only two color varieties of light, green light and red light, can be viewed as an almost full-color, three-dimensional picture to the human eye and a silver halide photosensitive material highly sensitive to two color varieties of light, green color and red color, can be produced. In other words, the principle of the invention can be demonstrated.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The entire disclosure of each and every foreign patent application from which the benefit of foreign priority has been claimed in the present application is incorporated herein by reference, as if fully set forth herein.

What is claimed is:

1. A silver halide-holographic sensitive material, comprising:
    a support; and
    at least one photosensitive silver halide emulsion layer comprising silver halide particles,
    wherein a number average diameter of circles equivalent to projected areas of the silver halide particles is from 10 nm to 80 nm,
    the silver halide particles are subjected to reduction sensitization in addition to gold-chalcogen sensitization in chemical sensitization thereof, and
    a silver iodide content of the silver halide particles is 5 mol % or less.

2. The silver halide-holographic sensitive material according to claim 1, wherein the reduction sensitization is performed by addition of a reducing sensitizer.

3. The silver halide-holographic sensitive material according to claim 1, wherein the at least one photosensitive silver halide emulsion layer further comprises a tetrazaindene compound in an amount of $3\times10^{-3}$ to $3\times10^{-2}$ mole per mole of silver in silver halide particles.

4. The silver halide-holographic sensitive material according to claim 1, wherein the at least one photosensitive silver halide emulsion layer comprises: at least one green-sensitive silver halide emulsion layer having an absorption maximum of 500 nm to 600 nm; and at least one red-sensitive silver halide emulsion layer having an absorption maximum of 600 nm to 750 nm.

* * * * *